(12) United States Patent
Schwab et al.

(10) Patent No.: US 12,445,164 B2
(45) Date of Patent: Oct. 14, 2025

(54) SHIFTING A FREQUENCY BAND OF AN INTERFERENCE SIGNAL OUT OF A PASS BAND OF A SIGNAL PATH

(71) Applicant: Andrew Wireless Systems GmbH, Buchdorf (DE)

(72) Inventors: Daniel Schwab, Gersthofen (DE); Peter Schmid, Marxheim-Neuhausen (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 379 days.

(21) Appl. No.: 17/802,498

(22) PCT Filed: Feb. 5, 2021

(86) PCT No.: PCT/EP2021/052883
§ 371 (c)(1),
(2) Date: Aug. 25, 2022

(87) PCT Pub. No.: WO2021/170379
PCT Pub. Date: Sep. 2, 2021

(65) Prior Publication Data
US 2023/0145768 A1    May 11, 2023

Related U.S. Application Data

(60) Provisional application No. 62/981,205, filed on Feb. 25, 2020.

(51) Int. Cl.
*H04B 1/10* (2006.01)
*H04B 1/525* (2015.01)

(52) U.S. Cl.
CPC ..... *H04B 1/525* (2013.01); *H04B 2001/1054* (2013.01)

(58) Field of Classification Search
CPC .. H04B 1/525; H04B 2001/1054; H04B 1/10; H04W 88/085; H04W 88/08
(Continued)

(56) References Cited

U.S. PATENT DOCUMENTS 10,205,481 B2 *  2/2019  Morrison ............... H01Q 1/525
2005/0064842 A1 *  3/2005  Patel ...................... H04B 15/02
                                                              455/345

(Continued)

FOREIGN PATENT DOCUMENTS

EP        1597839 B1    8/2007
EP        2715947 B1    8/2018
(Continued)

OTHER PUBLICATIONS

Bonjour et al., "Ultra-Fast Millimeter Wave Beam Steering", IEEE Journal of Quantum Electronics, vol. 52, No. 1, Jan. 2016, pp. 1 through 8.

(Continued)

*Primary Examiner* — Nathan S Taylor
(74) *Attorney, Agent, or Firm* — Fogg & Powers LLC

(57) ABSTRACT

In an embodiment, a communication circuit includes a frequency-shifting circuit coupled to a signal path, which is configured to carry, during a first period, an information signal having a first frequency. The frequency-shifting circuit is configured to receive a control signal, to shift the first frequency of the information signal by a second frequency in response to the control signal having a first control value, and to shift a third frequency of an interference signal on the signal path during a second period by a fourth frequency in response to the control signal having a second control value. For example, such a communication signal can be configured to shift the frequencies of an interference signal generated by the signal path out of the passband of an adjacent (Continued)

signal path to reduce the interference superimposed on a signal carried by the adjacent signal path.

19 Claims, 9 Drawing Sheets

(58) Field of Classification Search
USPC .................................................... 455/552.1
See application file for complete search history.

(56) References Cited

U.S. PATENT DOCUMENTS

| | | | | |
|---|---|---|---|---|
| 2008/0299933 | A1* | 12/2008 | Chang | H04B 1/10 455/307 |
| 2018/0062697 | A1* | 3/2018 | Morrison | H04B 1/0053 |
| 2020/0107362 | A1* | 4/2020 | Qi | H04W 88/085 |
| 2020/0259520 | A1* | 8/2020 | Crisp | G06K 7/10356 |
| 2021/0175915 | A1* | 6/2021 | Nilsson | H04B 1/1036 |
| 2023/0189315 | A1* | 6/2023 | Haustein | H04W 24/02 370/252 |
| 2023/0189382 | A1* | 6/2023 | Haustein | H04W 76/20 370/329 |

FOREIGN PATENT DOCUMENTS

| | | | | |
|---|---|---|---|---|
| EP | 2699034 B1 | * | 7/2019 | ........... H04B 7/2656 |
| WO | 2019120562 A1 | | 6/2019 | |

OTHER PUBLICATIONS

International Searching Authority, "International Search Report and Written Opinion from PCT Application No. PCT/EP2021/052883" dated May 6, 2021, pp. 1 through 13, Published in: EP.

* cited by examiner

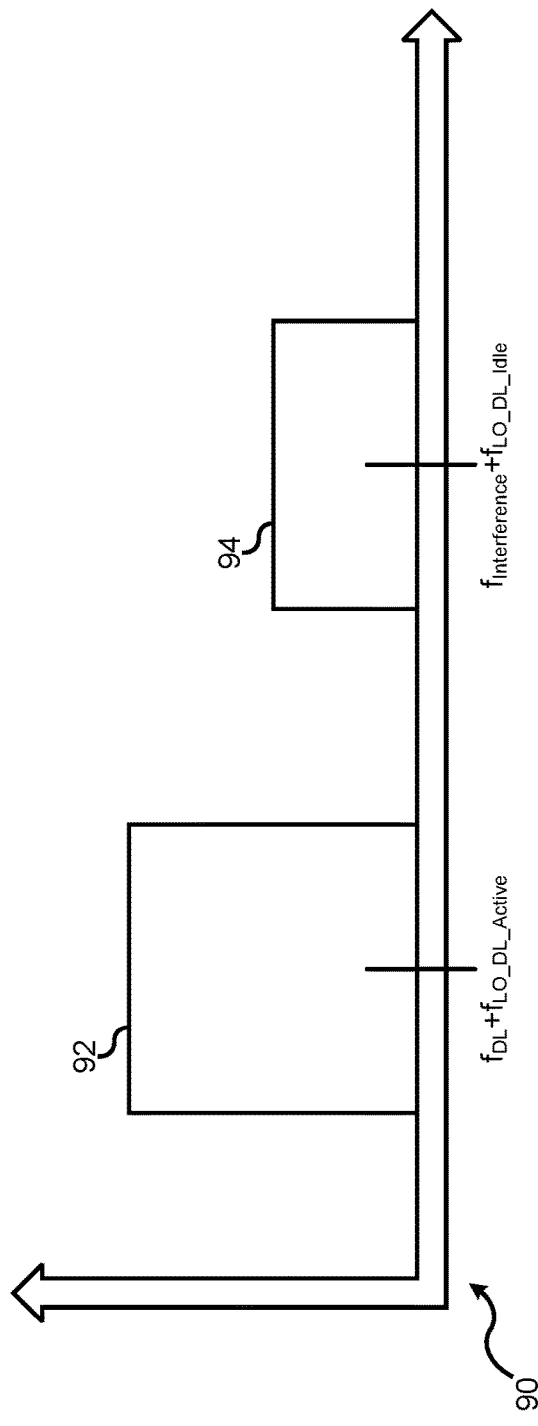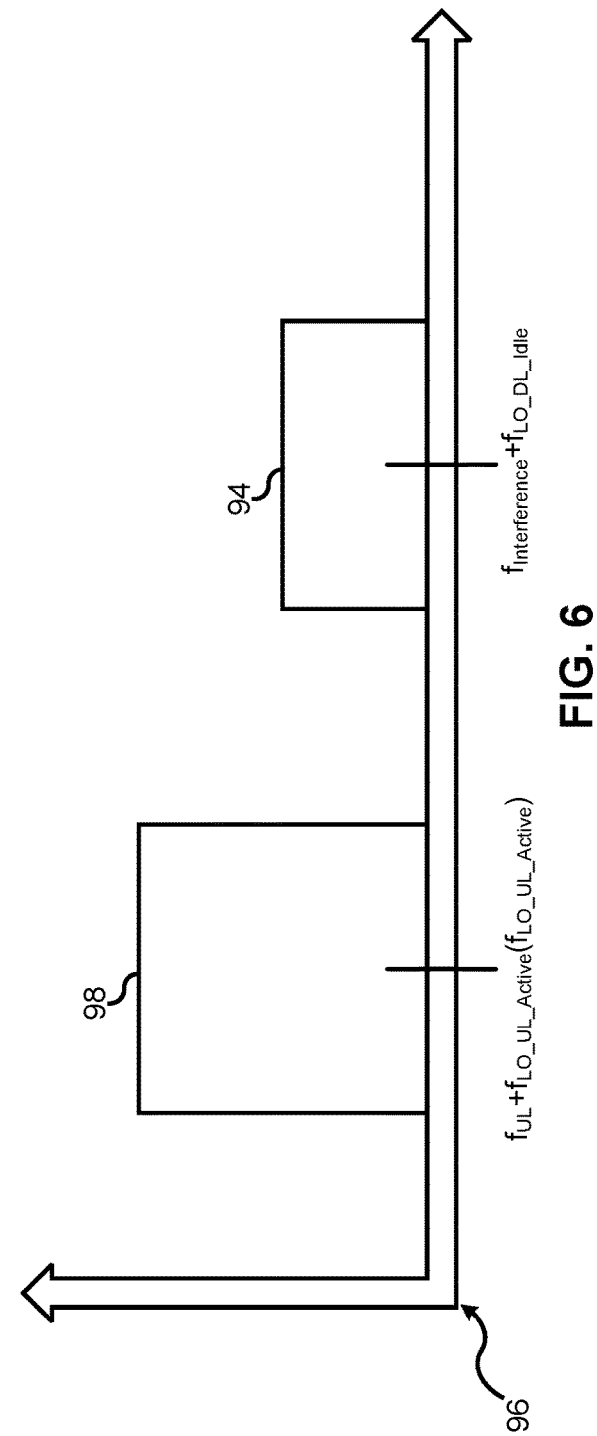

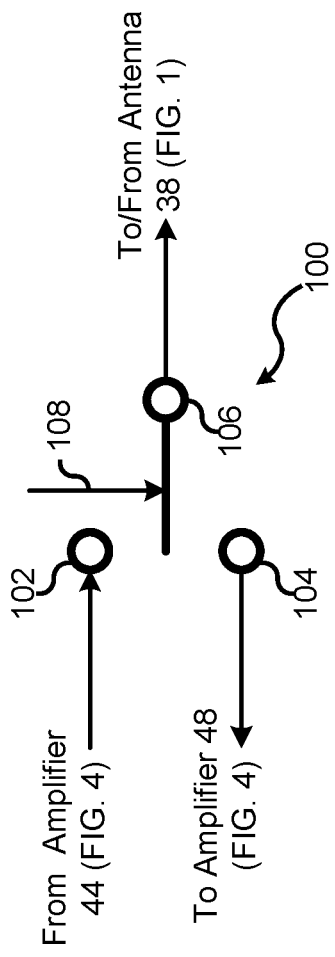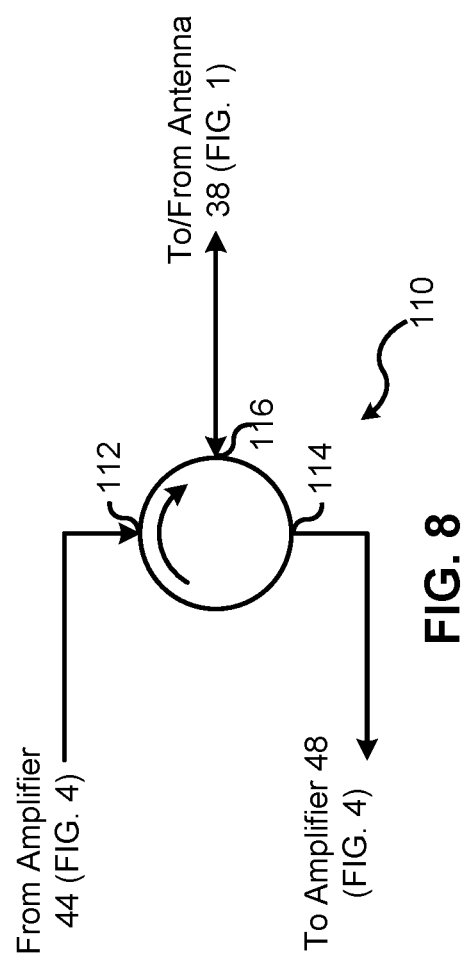

SHIFTING A FREQUENCY BAND OF AN INTERFERENCE SIGNAL OUT OF A PASS BAND OF A SIGNAL PATH

This application claims priority to International Patent Application No. PCT/EP2021/052883 filed on Feb. 5, 2021, which claims priority to U.S. Provisional Patent Application No. 62/981,205 filed on Feb. 25, 2020.

CROSS-REFERENCE TO RELATED APPLICATIONS

This application claims the benefit of U.S. Provisional Patent Application Ser. No. 62/981,205 entitled "SHIFTING A FREQUENCY BAND OF AN INTERFERENCE SIGNAL OUT OF A PASS BAND OF A SIGNAL PATH" filed on Feb. 25, 2020, which is incorporated herein by reference in its entirety.

SUMMARY

FIG. 1 is a block diagram of a distributed antenna system (DAS) 10, which is configured for coupling to one or more base stations 12, and which includes one or more remote antenna units 14. Typically, each base station 12 corresponds to, and is controlled by, a particular cellular operator such as T-Mobile®, Verizon®, or ATT®, and is configured to receive uplink signals, and to transmit downlink signals, via one or more of the remote antenna units 14. For example, each base station 12 can be configured to receive uplink signals and to transmit downlink signals via all of the remote antenna units 14 such that each cellular operator is afforded the full signal-coverage area that the DAS 10 is configured to serve.

When the DAS 10 operates in a time-division duplexing (TDD) mode, a remote antenna unit 14 receives and conditions an uplink signal with an uplink signal path while a downlink signal path is idle (i.e., is not conditioning or transmitting a downlink signal), and conditions and transmits a downlink signal with the downlink signal path while the uplink signal path is idle (i.e., is not receiving or conditioning an uplink signal). Conditioning a signal can include, for example, one or more of upshifting the signal in a frequency domain, downshifting the signal in a frequency domain, filtering the signal, amplifying the signal, converting the signal from a digital domain to an analog domain, and converting the signal from an analog domain to a digital domain.

But even while the downlink signal path is idle, it may generate an interference signal, such as a noise signal, that the uplink signal path receives while also receiving an uplink signal. For example, even while the downlink signal path is idle, one or more components that form the downlink signal path may be active, such one or more components including, for example, one or more of a local oscillator, a mixer, a power amplifier, a filter, a digital-to-analog converter (DAC), and an analog-to-digital converter (ADC). Reasons that one or more components of the downlink signal path may remain active even while the downlink signal path is idle include that the time to transition a component from an inactive state to a full active state is too long to warrant deactivating the component between periods during which the downlink signal path is active and that power-supply current spikes caused by activating and deactivating one or more components can cause potentially problematic voltage fluctuations and electromagnetic interference (EMI).

Consequently, even though the downlink signal path is not conditioning a downlink signal for transmission while the downlink signal path is idle, the active one or more components may cause the downlink signal path to generate an interference signal that may interfere with the ability of the uplink signal path to receive and condition an uplink signal. For example, one may characterize or model such interference as noise superimposed on the received uplink signal at one or more points along the uplink signal path.

More generally, any transmit signal Tx, whether a downlink signal, another type of transmit information-carrying signal, or a transmit interference signal, can interfere with any receive signal Rx, whether an uplink signal or another type of receive information-carrying signal. But for clarity, hereinafter only downlink signals and downlink signal paths, and uplink signals and uplink signal paths, are described, it being understood that the below-described techniques and embodiments can be applied to systems including transmit signals and transmit paths other than downlink signals and downlink signal paths and including receive signals and receive paths other than uplink signals and uplink signal paths.

A technique for reducing or eliminating, from an uplink signal, interference generated by an idle downlink signal path, is to isolate, electrically, the uplink signal path from the downlink signal path.

But unfortunately, because the interference generated by an idle downlink signal path can have a significant level of power, circuitry configured to provide a suitable level of electrical isolation between an uplink signal path and the downlink signal path can be difficult to design, and can be too costly or too large for one or more applications.

Therefore, a need has arisen for a technique for reducing, to an acceptable level, interference in an uplink signal path caused by an idle downlink signal path and for configuring circuits and systems to operate according to such a technique.

In an embodiment, a communication circuit configured to implement such a technique includes a signal path coupled to a frequency-shifting circuit. The signal path is configured to carry, during a first period, an information signal having a frequency. The frequency-shifting circuit is configured to receive a control signal, to shift the frequency of the information signal by a first frequency in response to the control signal having a first control value, and to shift a frequency of an interference signal on the signal path during a second period by a second frequency in response to the control signal having a second control value. For example, a frequency-shifting circuit coupled to a downlink signal path is configured, during a downlink-active period, to shift a frequency of a downlink signal by a first frequency, and is configured, during a downlink-idle period, to shift a frequency of any other signal, such as an interference signal, on the downlink signal path by a second frequency.

Furthermore, during a downlink-active period, while the downlink signal path is conditioning and transmitting a downlink signal and while the uplink signal path is idle, coupling of the downlink signal to the uplink signal path can cause a closed loop, formed by the downlink and uplink signal paths, to oscillate. For example, such oscillation can occur due to less-than-sufficient electrical isolation between the downlink and uplink signal paths.

Therefore, a need has arisen for a technique for preventing, in a closed loop formed by a downlink signal path and an uplink signal path, oscillation caused by leakage of a downlink signal into an uplink signal path.

The above-described embodiment also can be configured to implement such an oscillation-prevention technique. For example, a frequency-shifting circuit coupled to an uplink signal path is configured, during an uplink-active period, to shift a frequency of an uplink signal by a first frequency, and, during an uplink-idle period, is configured to shift a frequency of any other signal, such as a leakage component of a downlink signal, on the uplink signal path by a second frequency.

DRAWINGS

FIG. 5 is a plot of the frequency bands respectively occupied by a downlink signal generated by a downlink signal path during a downlink-active period, and by an interference signal generated by the downlink signal path during a downlink-idle period, according to an embodiment.

FIG. 6 is a plot of the frequency bands respectively occupied by an uplink and interference signals on an uplink signal path during an uplink-active period, according to an embodiment.

FIG. 7 is a diagram of an isolation circuit of FIG. 4, according to an embodiment.

FIG. 8 is a diagram of an isolation circuit of FIG. 4, according to another embodiment.

DETAILED DESCRIPTION

Figure 1:
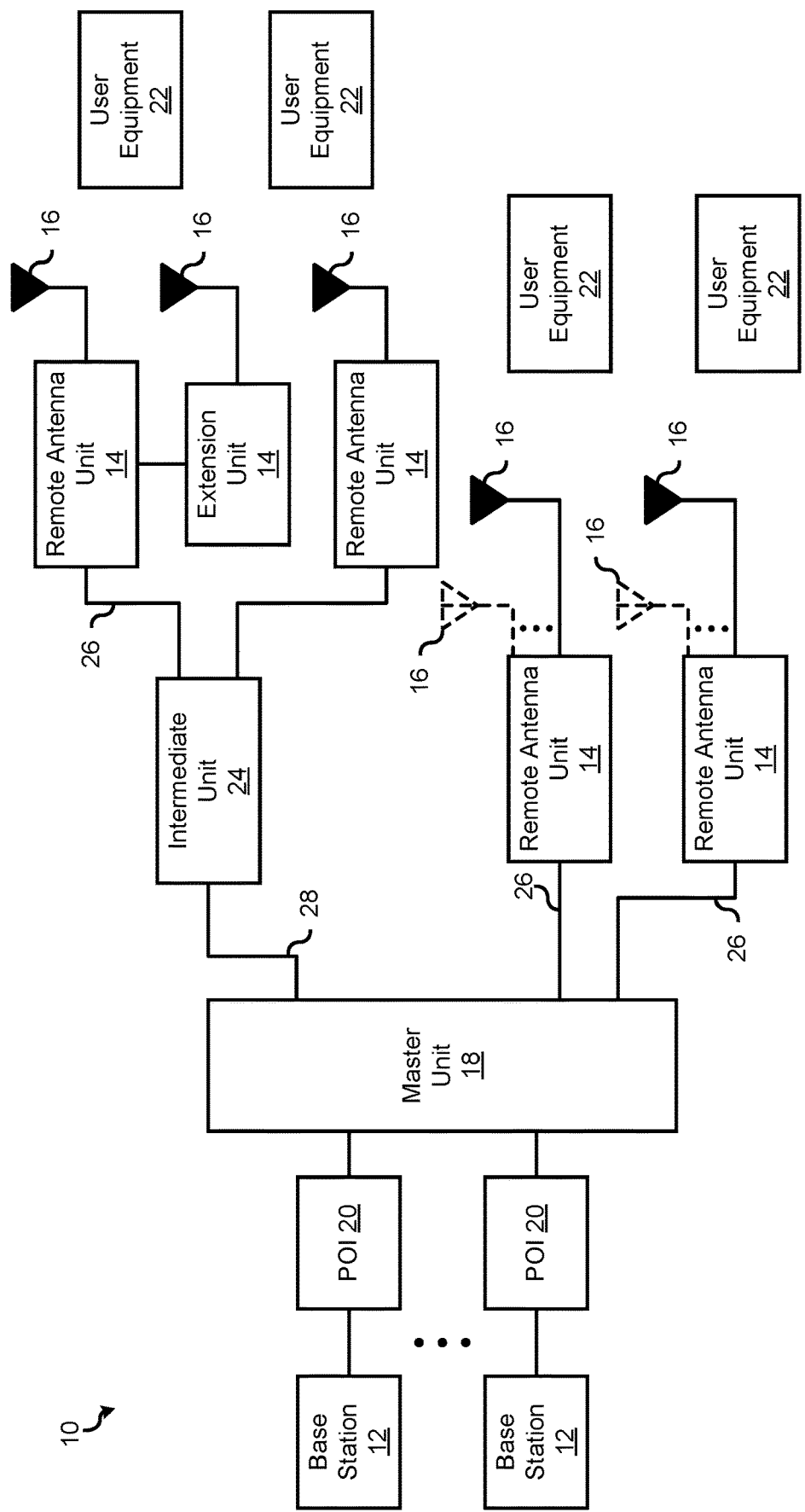
FIG. 1 is a diagram of a distributed antenna system (DAS), base stations coupled to the DAS, and user equipment configured for communicating with the DAS and with the base stations via the DAS.

"Approximately," "substantially," and similar words, as used herein, indicate that a given quantity b can be within a range b±10% of b, or b±1 if |10% of b|<1. "Approximately," "substantially," and similar words, as used herein, also indicate that a range |b−c| can be from |b−0.10|(c−b)| to c+0.10|(c−b)|||. Regarding the planarity of a surface or other region, "approximately," "substantially," and similar words, as used herein, indicate that a difference in thickness between a highest point and a lowest point of the surface/region does not exceed 0.20 millimeters (mm).

As described above, FIG. 1 is a diagram of a DAS 10, which is coupled to one or more base stations 12 and which includes one or more remote antenna units 14.

In an embodiment, one or more of the remote antenna units 14 can be configured to reduce, in one or more received signals, interference generated by one or more respective downlink signal paths by frequency shifting the interference out of the frequency band(s) of the received signal(s).

In another embodiment, each of one or more communication circuits can be configured to increase the stability of, and, therefore, to prevent oscillations in, a respective closed loop formed by a downlink signal path and an uplink signal path of the communication circuit, where each communication circuit is partially or fully disposed on a respective one of the remote antenna units 14.

The remote antenna units 14 of the DAS 10 typically are distributed within a structure (e.g., an office building, warehouse, mall, sports complex) or within an outdoor area (e.g., a stadium, a downtown, an outdoor event venue, a park, a beach) to provide wireless-communication coverage so that people can use their wireless devices (e.g., smartphones, tablets, pads, laptops) while within the structure or outdoor area. Examples of the types of wireless coverage provided by the DAS 10 can include Wi-Fi®, cellular service, and data service over one of the many available long-term-evolution (LTE) frequency bands (e.g., B1, B3, B7, B25, and B66). And the frequency range over which the DAS 10 can be configured to operate is, for example, approximately 600 MHz-71 GHz. For example, the DAS 10 can be configured to operate in the $5^{th}$-Generation New Radio (5GNR) frequency band of approximately 3.4 GHz-3.8 GHz.

In addition to the remote antenna units 14, the DAS 10 is coupled to, or includes, one or more master units 18, which are communicatively coupled to the remote antenna units. Further in an embodiment, the DAS 10 includes a digital DAS, in which DAS traffic is distributed between the master unit(s) 18 and the remote antenna units 14 in digital form. In other embodiments, the DAS 10 is implemented, at least in part, as an analog DAS, in which DAS traffic is distributed at least part of the way between the master unit(s) 18 and the remote antenna units 14 in analog form.

Each master unit 18 also is communicatively coupled to the one or more base stations 12, each of which can be co-located with the respective master unit 18 to which it is coupled (for example, where a base station 12 is dedicated to providing base-station capacity to only the DAS 10). Also, each of one or more of the base stations 12 can be located remotely from the respective master unit 18 to which it is coupled (for example, where the base station 12 is a macro base station providing base-station capacity to a macro cell in addition to providing capacity to the DAS 10). In this latter case, a master unit 18 can be coupled to a donor antenna (not shown in FIG. 1) to communicate wirelessly with the remotely located base station 12. Furthermore, one or more of the one or more base stations 12 each can be coupled to the master unit 18 using a respective network of attenuators, combiners, splitters, amplifiers, filters, cross-connects, etc., which respective network is referred to as a respective point-of-interface (POI) circuit 20. The base stations 12 use the POI circuits 20 to couple to the master unit 18 so that, in the downstream or downlink, the desired set of RF carriers output by the base station(s) 12 can be extracted, combined, and routed to the appropriate master unit 18, and so that, in the upstream or uplink, the desired set of carriers output by the master unit 18 can be extracted, combined, and routed to the appropriate interface of each base station 12.

The base station(s) 12 each can be implemented as a respective traditional, monolithic base station. Also, the base station(s) 12 each can be implemented using a distributed base-station architecture in which a baseband unit (BBU) (not shown in FIG. 1) is coupled to one or more remote radio heads (RRHs) (not shown in FIG. 1), where the front haul between the BBU and the RRH uses streams of digital IQ samples. Examples of such an approach are described in the Common Public Radio Interface (CPRI) and Open Base Station Architecture Initiative (OBSAI) families of specifications, which are incorporated by reference herein.

The master unit(s) 18 each can be configured to use wideband interfaces or narrowband interfaces to the base station(s) 12. Also, the master unit(s) 18 each can be configured to interface with the base station(s) 12 using analog radio-frequency (RF) interfaces or digital interfaces (for example, using a CPRI or OBSAI digital IQ interfaces).

Traditionally, each master unit 18 interfaces with each base station 12 using the analog radio-frequency signals that each base station 12 communicates to and from user equipment (e.g., smartphone, tablet, iPad, laptop) 22 using a suitable air-interface standard. The DAS 10 operates as a distributed repeater for such radio-frequency signals. RF signals transmitted from each base station 12 (also referred to herein as "downlink RF signals") are received at one or more master units 18. Each master unit 18 uses the downlink RF signals to generate a downlink transport signal distributed to one or more remote antenna units 14. Each such remote antenna unit 14 receives the downlink transport signal and reconstructs a version of the downlink RF signals based on the downlink transport signal and causes the reconstructed downlink RF signals to be radiated from at least one antenna array 16 included in, or otherwise coupled to, that remote antenna unit 14. Each antenna array 16 can include one or more antennas.

A similar process is performed in the uplink direction. RF signals transmitted from the user equipment 22 (also referred to herein as "uplink RF signals") are received at one or more remote antenna units 14. Each remote antenna unit 14 uses the uplink RF signals to generate an uplink transport signal transmitted from the remote antenna unit 14 to a master unit 18. Each master unit 18 receives uplink transport signals transmitted from one or more remote antenna units 14 coupled to it. The master unit 18 combines data or signals communicated via the uplink transport signals received at the master unit 18 and reconstructs a version of the uplink RF signals received at the remote antenna units 14. The master unit 18 communicates the reconstructed uplink RF signals to one or more base stations 12. In this way, the signal and communication coverage of the base station(s) 12 can be expanded using the DAS 10.

One or more intermediate units 24 (some of which are also referred to here as "expansion units") can be placed between the master unit(s) 18 and one or more of the remote antenna units 14. The one or more intermediate units 24 can be used, for example, to increase the number of remote antenna units 14 that a single master unit 18 can feed, to increase the master-unit-to-remote-unit distance, and/or to reduce the amount of cabling needed to couple a master unit 18 to its associated remote antenna units 14.

As noted above, the DAS 10 can be implemented as a "digital" DAS. In a "digital" DAS, signals received from and provided to the base station(s) 12 and user equipment 22 are used to produce digital in-phase (I) and quadrature (Q) samples, which are communicated between the master unit(s) 18 and the remote antenna units 14. It is noted that this digital IQ representation of the original signals received from the base station(s) 12 and from the user equipment 22 still maintains the original modulation (that is, the change in the amplitude, phase, or frequency of a carrier) used to convey telephony or data information according to the cellular air-interface protocol used for wirelessly communicating between the base station(s) 12 and the user equipment 22. Examples of such cellular air-interface protocols include, for example, 5GNR, the Global System for Mobile Communication (GSM), Universal Mobile Telecommunications System (UMTS), and Long-Term Evolution (LTE) air-interface protocols. Also, each stream of digital IQ samples represents or includes a portion of frequency spectrum. For example, the digital IQ samples can represent a single radio access network carrier (for example, a UMTS or LTE carrier of 5 MHz) onto which voice or data information has been modulated using a UMTS or LTE air interface. However, it is to be understood that each such stream can also represent multiple carriers (for example, in a band of frequency spectrum or a sub-band of a given band of frequency spectrum).

Furthermore, one or more of the master units 18 can be configured to interface with one or more base stations 12 using an analog RF interface (for example, either a traditional monolithic base station 12 or via the analog RF interface of an RRH). As described above, the base station(s) 12 can be coupled to the master units 18 using a network of attenuators, combiners, splitters, amplifiers, filters, cross-connects, etc., (sometimes referred to collectively as a "point-of-interface" or "POI" circuit 20). POI circuits 20 are used so that, in the downstream, the desired set of RF carriers output by the base station(s) 12 can be extracted, combined, and routed to the appropriate master unit 18, and so that, in the upstream, the desired set of carriers output by the master unit 18 can be extracted, combined, and routed to the appropriate interface of each base station 12.

Each master unit 18 can produce digital IQ samples from an analog signal received at radio-frequency (RF) by down-converting the received signal to an intermediate frequency (IF) or to baseband, digitizing the down-converted signal to produce real digital samples, and digitally down-converting the real digital samples to produce digital in-phase (I) and quadrature (Q) samples. These digital IQ samples also can be filtered, amplified, attenuated, and/or re-sampled or decimated to a lower sample rate. The digital samples can be produced in other ways. Each stream of digital IQ samples represents a portion of radio-frequency spectrum output by one or more base stations 12. Each portion of radio-frequency spectrum can include, for example, a band of spectrum, a sub-band of a given band of spectrum, or an individual carrier.

Likewise, in the upstream, each master unit 18 can produce an upstream analog signal from one or more streams of digital IQ samples received from one or more remote antenna units 14 by digitally combining streams of digital IQ samples that represent the same carriers or frequency bands or sub-bands (for example, by digitally summing such digital IQ samples), digitally up-converting the combined digital IQ samples to produce real digital samples, performing a digital-to-analog process on the real samples to produce an IF or baseband analog signal, and up-converting the IF or baseband analog signal to the desired RF frequency. The digital IQ samples can also be filtered, amplified, attenuated, and/or re-sampled or interpolated to a higher sample rate before and/or after being combined. The analog signal can be produced in other ways (for example, where the digital IQ samples are provided to a quadrature digital-to-analog converter that directly produces the analog IF or baseband signal).

One or more of the master units 18 can be configured to interface with one or more base stations 12 using a digital interface (in addition to, or instead of) interfacing with one or more base stations 12 via an analog RF interface. For example, the master unit 18 can be configured to interact directly with one or more BBUs using the digital IQ interface used for communicating between the BBUs and an RRHs (for example, using the CPRI serial digital IQ interface).

In the downstream, each master unit 18 terminates one or more downstream streams of digital IQ samples provided to it from one or more BBUs and, if necessary, converts (by re-sampling, synchronizing, combining, separating, gain adjusting, etc.) them into downstream streams of digital IQ samples compatible with the remote antenna units 14 used in the DAS 10. In the upstream, each master unit 18 receives upstream streams of digital IQ samples from one or more remote antenna units 14, digitally combining streams of digital IQ samples that represent the same carriers or frequency bands or sub-bands (for example, by digitally summing such digital IQ samples), and, if necessary, converts (by re-sampling, synchronizing, combining, separating, gain adjusting, etc.) them into upstream streams of digital IQ samples compatible with the one or more BBUs that are coupled to that master unit 18.

Each master unit 18 also can be implemented in other ways.

In the downstream, each remote antenna unit 14 receives streams of digital IQ samples from one or more master units 18, where each stream of digital IQ samples represents a portion of wireless radio-frequency spectrum output by one or more base stations 12.

Each remote antenna unit 14 is communicatively coupled to one or more master units 18 using, e.g., one or more optical fibers or cables, one or more ETHERNET-compatible cables 26 (for example, one or more CAT-6A cables), or any other suitable coupling medium. For example, in this embodiment, each remote antenna unit 14 can be directly connected to a master unit 18 via a single ETHERNET-compatible cable 26 or indirectly via multiple ETHERNET-compatible cables 26 such as where a first ETHERNET cable connects the remote antenna unit 14 to a patch panel or expansion/intermediate unit 24 and a second optical fiber cable 28 connects the patch panel or expansion/intermediate unit 24 to the master unit 18. Each remote antenna unit 14 can be coupled to one or more master units 18 in other ways. Also, the master unit 18 or expansion/intermediate unit(s) 24 can include one or more instances of power-supply equipment (PSE) configured to provide power to the remote antenna units 14.

Still referring to FIG. 1, alternate embodiments of the DAS 10, base stations 12, and user equipment 22 are contemplated. For example, embodiments described below in conjunction with FIGS. 2-11 may be applicable to the DAS 10, base stations 12, and/or user equipment 22 of FIG. 1.

Figure 2:
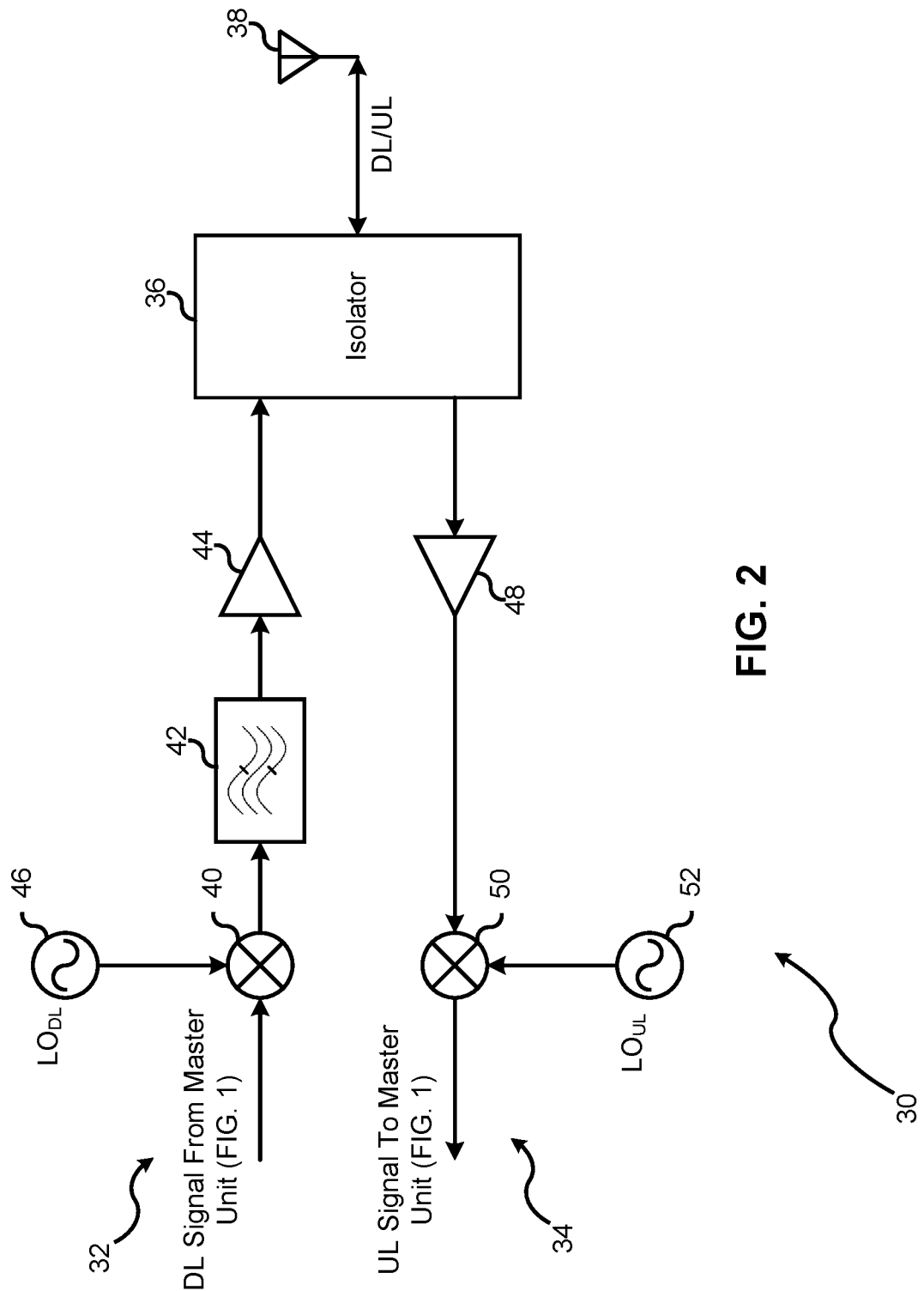
FIG. 2 is a diagram of a communication circuit of a remote antenna unit of FIG. 1, according to a first implementation.

FIG. 2 is a diagram of a communication circuit 30, which can be partially or fully disposed on a remote antenna unit 14 of FIG. 1. Where the communication circuit 30 is only partially disposed on a remote antenna unit 14, the remaining portion of the communication circuit 30 can be disposed on one or more of an expansion unit 14, a master unit 18, and an intermediate unit 24.

The communication circuit 30 includes a downlink signal path (also called a transmit signal path) 32, an uplink signal path (also called a receive signal path) 34, an isolation circuit 36 common to the downlink and uplink signal paths, and an antenna 38 also common to the uplink and downlink signal paths. The communication circuit 30 also can include other components that are omitted from FIG. 2.

In addition to the isolation circuit 36 and the antenna 38, the downlink signal path 32 includes a downlink mixer 40, a downlink bandpass filter 42, and a downlink amplifier 44. Also, a downlink local oscillator 46 generates and provides a downlink oscillator signal to the downlink mixer 40. The downlink local oscillator 46 can be considered part of or considered coupled to the downlink signal path 32. The downlink signal path 32 can include other downlink components (not shown in FIG. 2) preceding (e.g., downstream of) the downlink mixer 40, where such other components can include a digital-to-analog converter (DAC) and can be disposed on the remote antenna unit 14 (FIG. 1) or remote from the remote antenna unit 14, such as on the master unit 18 (FIG. 1) or an intermediate unit 24 (FIG. 1).

In addition to the isolation circuit 36 and the antenna 38, the uplink signal path 34 includes an uplink low-noise amplifier 48 and an uplink mixer 50. Also, an uplink local oscillator 52 generates and provides an uplink oscillator signal to the uplink mixer 50. The uplink mixer 50 and the uplink local oscillator 52 can be considered part of or considered coupled to the uplink signal path 34. The uplink signal path 34 can include other uplink components (not shown in FIG. 2) following (e.g., upstream of) the uplink mixer 50, where such other components can include a bandpass filter and an analog-to-digital (ADC) and can be disposed on the remote antenna unit 14 (FIG. 1) or remote from the remote antenna unit 14, such as on the master unit 18 (FIG. 1) or an intermediate unit 24 (FIG. 1).

Where the communication circuit 30 is configured to operate in a TDD mode, both the downlink signal path 32 and the uplink signal path 34 are configured to operate in approximately the same frequency band. For example, where the communication circuit 30 is configured for 5GNR applications, the downlink and uplink signal paths 32 and 34 can be configured to operate in the same frequency band within an approximate range of 10 GHz-60 GHz.

Consequently, noise, or other interference, that the downlink signal path 32 generates while the uplink signal path 34 is actively receiving and conditioning an uplink information signal can be superimposed on the uplink signal, and, therefore, can interfere with the ability of the uplink signal path 34 to receive and condition the uplink signal and/or with the ability of a base station 12 (FIG. 1) to recover information carried by the uplink signal.

In more detail, during a downlink active mode, the downlink mixer 40 receives, from the master unit 18 (FIG. 1), a baseband or intermediate-frequency downlink signal (hereinafter intermediate downlink signal) having a center frequency $f_{DL}$, and mixes the intermediate downlink signal with a local-oscillator signal generated by the downlink local oscillator 46 and having a frequency $f_{LO\_DL}$, which is typically higher than $f_{DL}$. A result of the signal mixing is that the intermediate downlink signal is upconverted, or upshifted, to a center frequency $f_{DL}+f_{LO\_DL}$. Alternatively, a result of the signal mixing may be that the intermediate downlink signal is downconverted, or downshifted, to the center frequency $f_{DL}-f_{LO\_DL}$. But hereinafter it is assumed, for purposes of example, that the result of the signal mixing is that the intermediate downlink signal is upconverted, or upshifted, to the center frequency $f_{DL}+f_{LO\_DL}$, it being understood that the techniques, embodiments, and principles described herein are also applicable if the intermediate signal is downconverted, or downshifted, to the center frequency $f_{DL}-f_{LO\_DL}$.

The downlink bandpass filter 42 filters the frequency-upshifted downlink signal from the downlink mixer 40 to remove any out-of-band frequencies.

The downlink amplifier 44 amplifies the filtered downlink signal from the downlink bandpass filter 42.

The isolation circuit 36 passes the amplified downlink signal from the downlink amplifier 44 to the antenna 38, and electrically isolates the uplink signal path 34 from the downlink signal path 32.

And the antenna 38 radiates the amplified downlink signal to one or more of the user equipment 22 (e.g., a smartphone or other device) of FIG. 1.

During a downlink-inactive, or downlink-idle, mode or period, the downlink mixer 40 receives no baseband or intermediate downlink signal from the master unit 18 (FIG. 1). But the downlink local oscillator 46 is still active, and, therefore, still generates the local-oscillator signal having the frequency $f_{LO\_DL}$. Therefore, the downlink mixer 40 mixes noise at its input node (the node at which the downlink mixer 40 receives the baseband or intermediate downlink signal during a downlink-active mode) and any noise that the downlink mixer 40 itself generates, with the local-oscillator signal, and generates a noise, or interference, signal that is upshifted to a frequency band having a center frequency $f_{interference}+f_{LO\_DL}$ ($f_{interference}$ is the center frequency of the frequency band of the interference before upshifting). At the input node of the downlink mixer 40, noise within the baseband and intermediate downlink band, respectively, has a significantly higher magnitude/power than noise of the same bandwidth but outside the intermediate downlink band. Reasons that the downlink local oscillator 46 remains active during a downlink-idle period include that the duration of a downlink-idle period may be too short for deactivating the downlink local oscillator 46 due, for example, to the startup time for the downlink local oscillator 46, the step decrease in the supply current, and the corresponding step increase in the supply voltage, upon deactivating the downlink local oscillator 46, and the step increase in the supply current, and the corresponding step decrease in the supply voltage, upon activating the downlink local oscillator 46.

The downlink bandpass filter 42 filters the upshifted interference signal from the downlink mixer 40 to remove any out-of-band frequencies (e.g., frequencies not in the frequency band of the downlink signal that the downlink signal path 32 conditions and transmits during a downlink active mode). If the downlink bandpass filter 42 is passive, then it is effectively operational at all times. If the downlink bandpass filter 42 is active, then it may remain active during a downlink-idle period for one or more of the same reasons that the local oscillator 46 remains active during a downlink-idle period.

The downlink amplifier 44 amplifies the filtered interference signal from the downlink bandpass filter 42. The downlink amplifier 44 remains active during a downlink-idle period for one or more of the same reasons that the local oscillator 46 remains active during a downlink-idle period.

The isolation circuit 36 passes the amplified interference signal from the downlink amplifier 44 to the antenna 38 and electrically isolates the uplink signal path 34 from the downlink signal path 32.

The antenna 38 radiates the amplified interference signal.

While the downlink signal path 32 is idle, the uplink signal path 34 may be active, and, therefore, may receive an uplink signal from the user equipment 22 (FIG. 1) and condition the received uplink signal.

But, because the amplified interference signal can be relatively strong, a significant (in terms of power) component of the amplified interference signal may "leak" through the isolation circuit 36 onto the uplink signal path 34.

Furthermore, one or more environmental objects (not shown in FIG. 2) may redirect a component of the radiated interference signal back to the antenna 38, which receives the redirected component along with the uplink signal.

Therefore, the uplink signal path 34 receives a signal that is the superposition of one or more components of the interference signal on the uplink signal, which is the signal of interest.

Because the superimposed interference is in approximately the same frequency band as the uplink signal, the one or more filters of the uplink signal path 34 remove little or none of the superimposed interference from the uplink signal.

If the superimposed interference is powerful enough, it can "corrupt" the received uplink signal by rendering the uplink signal path 34 unable to accurately condition the uplink signal or rendering circuitry proceeding the uplink mixer 50 unable to recover information that the received uplink signal carries.

Furthermore, the uplink signal path 34 can experience the same problem, receiving an uplink signal corrupted by a superimposed interference, even when a downlink signal path of a different communication circuit generates the interference signal (the interference signal would need to be in approximately the same frequency band as the uplink signal, and the antenna 38 would need to receive a component of the interference signal). The different communication circuit can be located on the same remote antenna unit 14 (FIG. 1) as the communication circuit 30 or can be located on a different remote antenna unit 14 than the communication circuit 30.

A potential solution for reducing or eliminating, in the uplink signal path 34, interference generated by the downlink signal path 32 of the same communication circuit 30, is to set, to a suitable level, the isolation that the isolation circuit 36 provides.

But it can be difficult to design an isolation circuit 36 that provides a suitable level of isolation for a suitable cost and a suitable size.

Still referring to FIG. 2, consider the following example.

Assume that the downlink signal path 32 is configured to transmit a downlink signal with a composite power of 43 dBm with a transmit noise floor of −30 dBm/MHz. Also, assume that in the absence of the isolation circuit 36, this transmit noise floor is present while the downlink signal path 32 is actively conditioning and transmitting a downlink signal, and is also present while the downlink signal path 32 is idle and the uplink signal path 34 is actively receiving and conditioning an uplink signal. Further assume that the receive noise figure (NF) for the uplink signal path 34 is 4 dB, and that the thermal noise floor at 25° C. at the input of the uplink signal path (e.g., at the input node of the uplink amplifier 48) is −174 dBm/Hz, which is, equivalently, −114 dBm/MHz. Therefore, the noise floor at the input of the uplink signal path 34 can be determined to be −114 dBm/MHz+4 dB=−110 dBm/MHz.

If an application calls for the noise floor of the uplink signal path 34 to be degraded no more than 0.5 dB, then the application calls for the overlaying transmit noise floor to be at least 10 dB below the receive noise floor. Consequently, the application calls for the level of isolation between the downlink signal path 32 and the uplink signal path 34 to be −30 dBm/MHz−(−110 dBm/MHz−10 dB)=90 dB. But a single isolation circuit 36, or a single isolation technique, may be unable to provide a suitably high level of isolation between the downlink signal path 32 and the uplink signal path 34. To achieve such a high level of isolation, one could design the communication circuit 30 to incorporate, or otherwise to implement, multiple isolator circuits or multiple other isolation techniques.

For example, one such technique is to reduce the in-band gain of the downlink amplifier 44 while the downlink signal path 32 is idle by shifting the bias levels, and therefore, by shifting the operating points of one or more transistors (not shown in FIG. 2) internal to the downlink amplifier 44. Such shifting of the transistor operating points can reduce the in-band gain of the downlink amplifier 44 without deactivating the downlink amplifier 44.

Although such transistor-operating-point shifting can reduce the in-band gain of the downlink amplifier 44 enough so that the combination of the reduced amplifier gain and the isolation circuit 36 provides a suitable level of isolation between the downlink signal path 32 and the uplink signal path 34. While the downlink signal path 32 is idle, such transistor-operating-point shifting can increase one or more of the cost, size, and power consumption of the downlink amplifier 44. For example, each of one or more of the amplifier transistors may need to be made larger (e.g., made to have a thicker gate dielectric or to occupy a larger area) to survive the repeated switching cycles that shift the transistor operating points at the commencement of each downlink-active and downlink-idle period of the downlink signal path 32. Furthermore, the addition of the circuitry configured to perform the transistor-operating-point shifting can increase the size, cost, and power consumption of the downlink amplifier 44.

Figure 3:
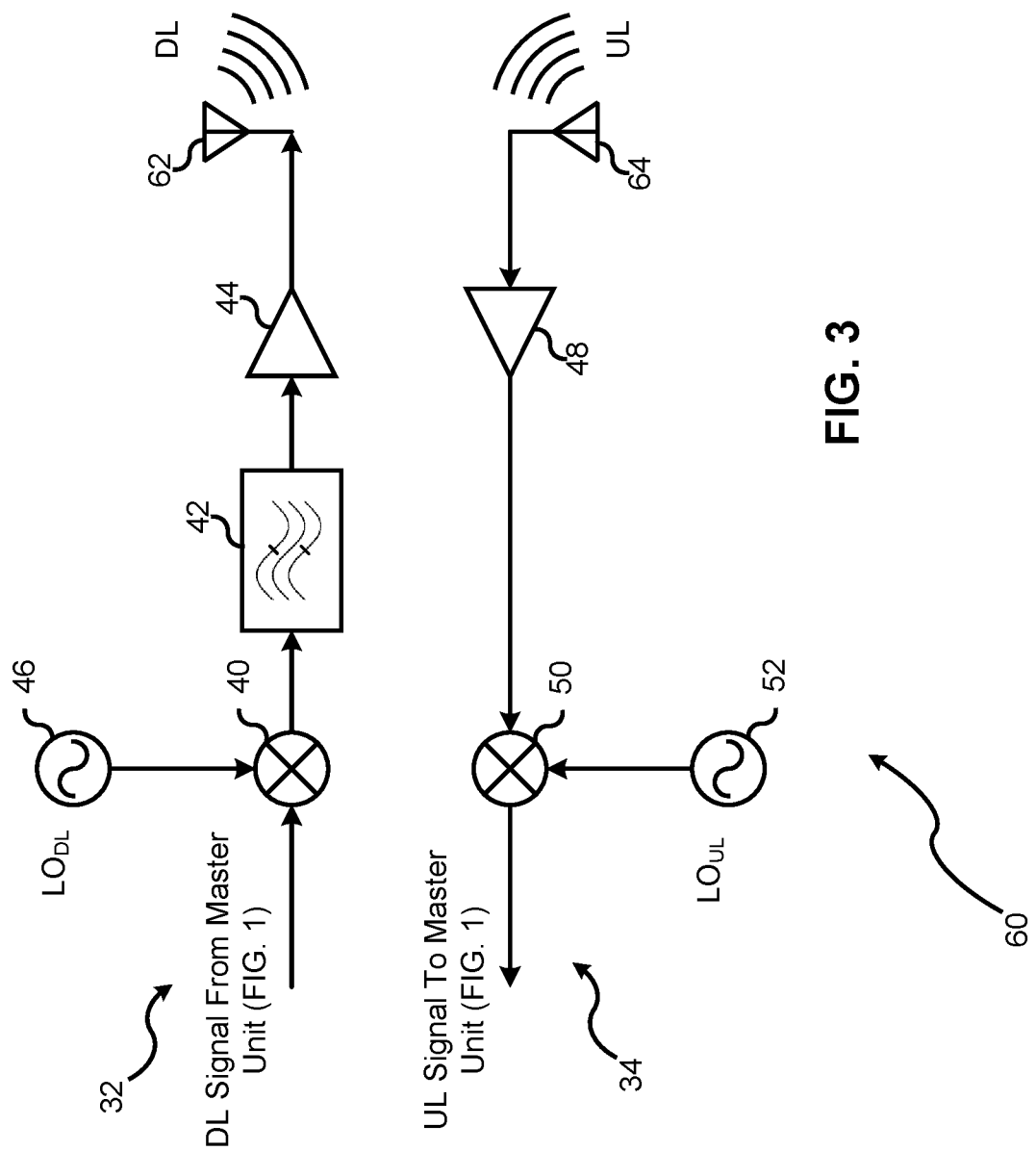
FIG. 3 is a diagram of a communication circuit of a remote antenna unit of FIG. 1, according to a second implementation.

FIG. 3 is a diagram of a communication circuit 60 of a remote antenna unit 14 (FIG. 1), and in which like numerals refer to items common to the communication circuit 30 of FIG. 2 and the communication circuit 60 of FIG. 3.

Referring to FIG. 3, instead of including an isolation circuit 36 (FIG. 2) to provide electrical isolation between the downlink and uplink signal paths 32 and 34, the communication circuit 60 includes separate downlink and uplink antennas 62 and 64 to provide electrical isolation between the downlink and uplink signal paths.

In more detail, the downlink and uplink antennas 62 and 64 are highly directional, the downlink antenna 62 is oriented to radiate a downlink signal in a direction away from the uplink antenna 64, and the uplink antenna 64 is oriented to receive an uplink signal from a direction away from the downlink antenna 62. Or, said another way, the main beams of the downlink and uplink antennas 62 and 64 are oriented in different directions. Unfortunately, the described separate-antenna technique may suffer from one or more problems.

For example, a technician may need to orient the antennas 62 and 64 during assembly and testing of the remote antenna unit 14 (FIG. 1) on which the communication circuit 60 is disposed, or a technician may need to orient or reorient the antennas during installation of the remote antenna unit 14. Such orientation and reorientation by a technician, particularly during installation, can be time consuming and, therefore, can increase the cost of manufacturing and installation of the remote antenna and the DAS 10 (FIG. 1), which includes the remote antenna unit 14. Furthermore, adding an extra antenna (as compared to the communication circuit 30 of FIG. 2) can also add extra cost and increase the complexity of assembling, testing, and installing the remote antenna unit 14.

Moreover, clutter in the environment in which the communication circuit 60 is installed may render the separate downlink and uplink antennas 62 and 64 unable to provide a suitable level of electrical isolation between the downlink and uplink signal paths 32 and 34. For example, an object (e.g., a structural beam, light fixture, wall, furniture) proximate to the communication circuit 60 may redirect, to the uplink antenna 64, interference radiated by the downlink antenna 62, even if the downlink antenna radiates the interference away from the uplink antenna.

If one or more potential interference-redirecting objects in the installation environment are stationary, then an installation technician may be able to orient, or reorient, the antennas 62 and 64 to reduce such redirections of interference to acceptable levels. But, as described above, such orientation and reorientation by a technician during installation can be time-consuming and, therefore, can increase the cost of installing the DAS 10 (FIG. 1).

Furthermore, in an installation environment where the clutter is not stationary, orientation and reorientation of the antennas 62 and 64 may be ineffective at reducing redirections of interference to acceptable levels.

Figure 4:
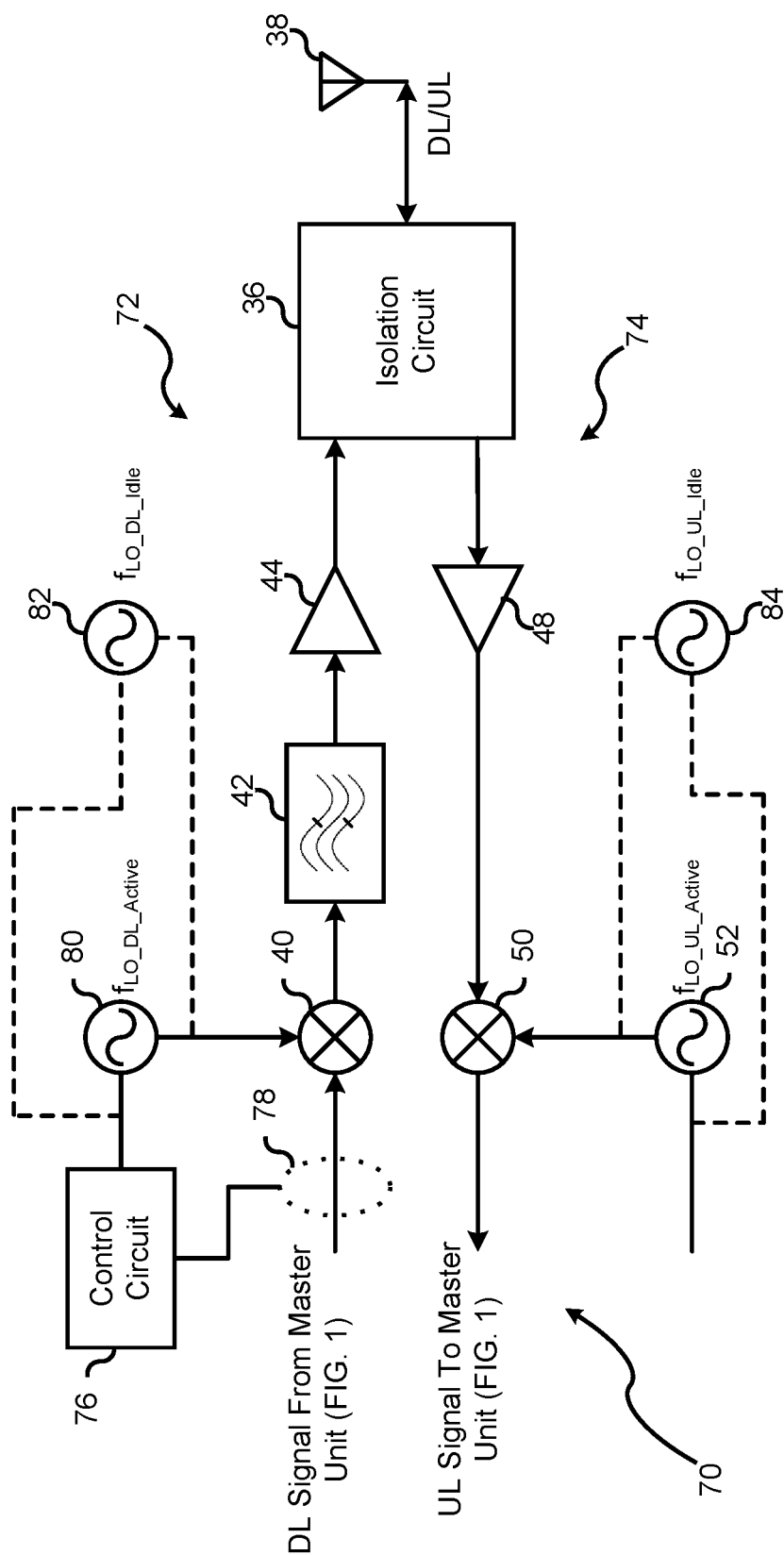
FIG. 4 is a diagram of a communication circuit of a remote antenna unit of FIG. 1, where the communication circuit is configured to implement frequency-shifting and passive isolation, according to an embodiment.

FIG. 4 is a diagram of a communication circuit 70, which can form part of the DAS 10 of FIG. 1, according to an embodiment. For example, part or all of the communication circuit 70 can be disposed on a respective remote antenna unit 14 (FIG. 1) of the DAS 10. Furthermore, in FIG. 4, items common to the communication circuits 30 and 60 of FIGS. 2 and 3, respectively, are labeled with the same reference numerals.

As described in more detail below, the communication circuit 70 provides at least a portion of the electrical isolation between a downlink signal path 72 and an uplink signal path 74 by shifting interference generated by the downlink signal path 72 out of the radio-frequency (RF) band of the uplink signal path. Therefore, even if the uplink signal path 74 receives the interference superimposed on an uplink signal, the uplink signal path 74 filters out some or all of the energy of the out-of-band interference signal.

In addition to the downlink signal path 72 and the uplink signal path 74, the communication circuit 70 includes an isolation circuit 36 and an antenna 38, both of which are common to the downlink and uplink signal paths, and includes a control circuit 76, which is coupled to both the downlink and uplink signal paths.

In addition to the isolation circuit 36 and the antenna 38, the downlink signal path 72 includes a downlink mixer 40, a downlink bandpass filter 42, a downlink amplifier 44, and a downlink-signal sensor 78. A downlink-active local oscillator 80, which is configured to generate a first downlink oscillator signal while the downlink signal path 72 is actively conditioning and transmitting a downlink signal, can be considered to be part of, or coupled to, the downlink signal path. And an optional downlink-idle local oscillator 82, which is configured to generate a second downlink oscillator signal while the downlink signal path 72 is idle (e.g., is neither conditioning nor transmitting a downlink signal), can be considered to be part of, or coupled to, the downlink signal path. The combination of the downlink mixer 40 and the local oscillators 80 and 82 is a downlink frequency-shifting circuit. Furthermore, the downlink signal path 72 can include other downlink components (not shown in FIG. 4) preceding (e.g., downstream of) the downlink mixer 40, where such other components can include a digital-to-analog converter (DAC) and can be disposed on the remote antenna unit 14 (FIG. 1) or can be disposed remote from the remote antenna unit 14, such as on the master unit 18 (FIG. 1) or an intermediate unit 24 (FIG. 1).

In addition to the isolation circuit 36 and the antenna 38, the uplink signal path 74 includes an uplink amplifier 48 and an uplink mixer 50. An uplink-active local oscillator 52, which is configured to generate a first uplink oscillator signal while the uplink signal path 74 is actively receiving and conditioning an uplink signal, can be considered to be part of, or can be considered to be coupled to, the uplink signal path 74. And an optional uplink-idle local oscillator 84, which is configured to generate a second uplink oscillator signal while the uplink signal path 74 is idle (e.g., the uplink signal path 74 is neither receiving nor conditioning an uplink signal), can be considered to be part of, or can be considered to be coupled to, the uplink signal path. The combination of the uplink mixer 50 and the local oscillators 52 and 84 is an uplink frequency-shifting circuit. Furthermore, the uplink signal path 74 also can include other uplink components (not shown in FIG. 4) following (e.g., upstream of) the uplink mixer 50, where such other components can include a bandpass filter and an analog-to-digital (ADC), and can be disposed on the remote antenna unit 14 or can be disposed remote from the remote antenna unit 14, such as on the master unit 18 (FIG. 1) or on an intermediate unit 24 (FIG. 1).

Where the communication circuit 70 is configured to operate in a TDD mode, both the downlink signal path 72 and the uplink signal path 74 are configured to operate in approximately the same intermediate-frequency (IF) band (before the input to the downlink mixer 40 and after the output of the uplink mixer 50) and in a same radio-frequency (RF) band (after the output of the downlink mixer 40 and before the input of the uplink mixer 50). For example, where the communication circuit 70 is configured for 5GNR applications, the downlink and uplink signal paths 72 and 74 can be configured for operation in an approximately same RF band within an approximate range of 10 GHz-60 GHz.

As described above in conjunction with FIG. 2, the downlink bandpass filter 42 is configured to filter the upshifted downlink signal from the downlink mixer 40 to remove any out-of-band frequencies, the downlink amplifier 44 is configured to amplify the filtered downlink signal from the downlink bandpass filter 42, and the isolation circuit 36 is configured to pass the amplified downlink signal from the downlink amplifier 44 to the antenna 38 and to isolate, electrically, the uplink signal path 74 from the downlink signal path 72. And the antenna 38 is configured to radiate the amplified downlink signal to one or more of the user equipment 22 (e.g., a smartphone or other device) of FIG. 1.

The control circuit 76 is configured to control which of the downlink local oscillators 80 and 82 provides a downlink oscillator signal to the downlink mixer 40 and which of the uplink local oscillators 52 and 84 provides an uplink oscillator signal to the uplink mixer 50.

The sensor 78 is configured to detect whether there is a downlink signal at the input node of the downlink mixer 40 and provide a sensor signal to the control circuit 76 in response to detecting the presence or absence of the downlink signal.

The downlink local oscillator 80 is configured to generate a downlink oscillator signal having a frequency $f_{LO\_DL\_Active}$, and the optional downlink local oscillator 82 is configured to generate a downlink oscillator signal having a frequency $f_{LO\_DL\_Idle}$.

Similarly, the uplink local oscillator 52 is configured to generate an uplink oscillator signal having a frequency $f_{LO\_UL\_Active} \approx f_{LO\_DL\_Active}$, and the optional uplink local oscillator 84 is configured to generate an uplink oscillator signal having a frequency $f_{LO\_UL\_Idle}$.

As described in more detail below, to provide electrical isolation in addition to the isolation that the isolation circuit 36 is configured to provide, the downlink signal path 72 is configured, during a downlink-idle period, to shift the frequencies of an interference signal that the downlink signal path 72 generates out of the RF band of uplink signals that the uplink signal path 74 is configured to receive and to condition. Such frequency shifting allows the uplink signal path 74 to filter, from a received uplink signal, a received component of the downlink upshifted interference signal. Or, said another way, shifting the frequencies of the interference signal can reduce the level of isolation that the isolation circuit 36 needs to provide for proper operation of the communication circuit 70, and, therefore, can reduce the complexity and cost of the isolation circuit 36.

FIG. 5 is a plot 90 of a frequency band 92 of a downlink signal radiated by the antenna 38 (FIG. 4) during a downlink-active period, and of a frequency band 94 of an upshifted interference signal generated by the downlink signal path 72 (FIG. 4) during a downlink-idle period, according to an embodiment.

FIG. 6 is a plot 96 of a frequency band 98 of an uplink signal received by the antenna 38 (FIG. 4) during an uplink-active period, and of the frequency band 94 of the upshifted interference signal generated by the downlink signal path 72 (FIG. 4) during the uplink-active period, according to an embodiment.

Referring to FIGS. 4-6, operation of the communication circuit 70 is described according to an embodiment in which the communication circuit 70 includes the optional downlink local oscillator 82 but lacks the optional uplink local oscillator 84.

During a downlink-active period, the downlink mixer 40 receives, from the master unit 18 (FIG. 1), a baseband or intermediate-frequency downlink signal (hereinafter "intermediate downlink signal") having a center frequency $f_{DL}$. In response to the intermediate downlink signal propagating along the downlink signal path 72 to the downlink mixer 40, the sensor 78 generates a sense signal having a first value that indicates the detection of the intermediate downlink signal by the sensor 78.

In response to the sense signal having the first value, the control circuit 76 activates the downlink-active local oscillator 80 and deactivates the downlink-idle local oscillator 82. The downlink mixer 40 mixes the intermediate downlink signal with a local-oscillator signal generated by the downlink-active local oscillator 80 and having a frequency $f_{LO\_DL\_Active}$ to upshift the intermediate downlink signal to a frequency band having a center frequency equal to $f_{DL} + f_{LO\_DL\_Active}$.

The downlink bandpass filter 42 filters the upshifted downlink signal from the downlink mixer 40 to remove any out-of-band frequencies (e.g., frequencies not in the upshifted frequency band of the downlink signal) such that the upshifted downlink signal occupies the RF band 92. The downlink amplifier 44 amplifies the filtered downlink signal from the downlink bandpass filter 42. The isolation circuit 36 receives the amplified upshifted downlink signal from the downlink amplifier 44, passes the amplified upshifted downlink signal to the antenna 38, and electrically isolates the uplink signal path 74 from the downlink signal path 72. And the antenna 38 radiates the amplified upshifted downlink signal to user equipment 22 (FIG. 1).

Operation of the uplink signal path 74 while the uplink signal path 74 is idle and the downlink signal path 72 is active is described below in conjunction with FIG. 11.

Still referring to FIGS. 4-6, during a downlink idle mode, the downlink mixer 40 receives no intermediate downlink signal from the master unit 18 (FIG. 1). In response to the intermediate downlink signal being absent from the downlink signal path 72, the sensor 78 generates the sense signal having a second value that indicates the detection of a lack of an intermediate downlink signal by the sensor 78. In response to the sense signal having the second value, the control circuit 76 deactivates the downlink-active local oscillator 80 and activates the downlink-idle local oscillator 82.

For reasons similar to those described above in conjunction with the communication circuit 30 of FIG. 2, the downlink mixer 40 effectively mixes an interference signal on the downlink signal path 72 having a center frequency $f_{interference}$ with a local-oscillator signal generated by the downlink-idle local oscillator 82 having a frequency $f_{LO\_DL\_Idle}$ to upshift the interference signal to a center frequency equal to $f_{interference}+f_{LO\_DL\_Idle}$. Because $f_{LO\_DL\_Idle}$ is greater than $f_{LO\_DL\_Active}$, the RF band 94 of the downlink upshifted interference signal is significantly higher in frequency than the RF band 92 of the upshifted downlink signal that the downlink signal path 72 generates while the downlink signal path 72 is actively conditioning and transmitting a downlink signal.

Because the downlink bandpass filter 42 has a passband approximately equal to the RF band 92 of an upshifted downlink signal generated by the downlink signal path 72 during a downlink active period, and because the RF band 94 of the downlink upshifted interference signal is significantly higher in frequency than the RF band 92, the downlink bandpass filter 42 rejects much of the power of the downlink upshifted interference signal.

The downlink amplifier 44 amplifies the reduced-power component of the filtered downlink upshifted interference signal that passes through the downlink bandpass filter 42. The isolation circuit 36 passes the amplified component of the downlink upshifted interference signal from the downlink amplifier 44 to the antenna 38, and electrically isolates the uplink signal path 74 from the downlink signal path 72.

And the antenna 38 radiates the amplified component of the downlink upshifted interference signal, which, as shown in FIGS. 5-6, occupies the RF band 94.

Still referring to FIGS. 4-6, during an uplink active period, the uplink signal path 74 further rejects any received downlink upshifted interference components generated by the idle downlink signal path 72.

There are two sources from which the uplink signal path 74 can receive a respective downlink upshifted interference component: 1) leakage of a downlink upshifted interference component through the isolation circuit 36, which, as described above, may provide imperfect isolation, and 2) a redirection, by an object in the environment, back to the antenna 38, of a downlink upshifted interference component that the antenna 38 radiated.

For purposes of example, assume that the uplink signal path 74 receives, from both of these sources, respective downlink upshifted interference components superimposed on an uplink signal. But the below description and analysis is similar even if the uplink signal path 74 receives a downlink upshifted interference component from only one of these sources.

The antenna 38 receives an uplink signal on which is superimposed a redirected component of the downlink upshifted interference signal. The isolation circuit 36 passes the uplink signal on which is superimposed the redirected downlink upshifted interference signal to an input node of the uplink amplifier 48. Furthermore, a leakage component of the downlink upshifted interference signal "leaks" through the isolation circuit 36 to the input node of the uplink amplifier 48. Therefore, the uplink amplifier 48 receives at its input node, and amplifies, the uplink signal on which is superimposed both the redirected and leakage components of the downlink upshifted interference signal.

Referring to FIG. 6, the uplink signal occupies the RF band 98, which is centered at a frequency $f_{UL}+f_{LO\_UL\_Active}$, where $f_{LO\_UL\_Active} \approx f_{LO\_DL\_Active}$, but the redirected and leakage components of the downlink upshifted interference signal occupy the RF band 94, which is at a significantly higher frequency than the RF band 98. For example, the separation between the center frequencies of the RF bands 94 and 98 is significantly larger than the bandwidth of the RF band 92. Further in example, if the RF band 92 is approximately 80 MHz wide, then the separation between the center frequencies of the RF bands 94 and 98 can be approximately 100 MHz or more.

The uplink mixer 50 mixes the amplified uplink signal on which is superimposed the redirected and leakage components of the downlink upshifted interference signal with the oscillator signal from the uplink local oscillator 52 having a frequency approximately equal to $f_{LO\_UL\_Active}$.

That is, the uplink mixer 50 downshifts the frequencies of the uplink signal and the superimposed components of the downlink upshifted interference signal such that the downshifted uplink signal occupies an IF band (not shown in FIGS. 4-6) centered at $f_{UL}$, and such that the downlink downshifted interference components occupy an IF band centered at $f_{interference}+(f_{LO\_DL\_Idle}-f_{LO\_UL\_Active})$.

Therefore, the center frequency of the IF band (not shown in FIGS. 4-6) occupied by the downlink downshifted interference components is higher than the center frequency $f_{UL}$ of the IF band (not shown in FIGS. 4-6) occupied by the downshifted uplink signal by a frequency equal to $f_{LO\_DL\_Idle}-f_{LO\_UL\_Active}$.

As long as the difference frequency $f_{LO\_DL\_Idle}-f_{LO\_UL\_Active}$ is large enough, the one or more filters (not shown in FIG. 4) proceeding the uplink mixer 50 pass the uplink signal centered at $f_{UL}$ and reject the components of the downlink downshifted interference signal centered at $f_{interference}+(f_{LO\_DL\_Idle}-f_{LO\_UL\_Active})$.

Still referring to FIGS. 4-6, by upshifting the frequencies of interference generated by the downlink signal path 72 to an RF band that is higher than the frequency bands 92 and 98 of an upshifted downlink signal and a received uplink signal, respectively, the communication circuit 70 electrically isolates, in at least three ways, the uplink signal path 74 from interference generated by the downlink signal path 72 during a downlink-idle period. First, the downlink bandpass filter 42 rejects the downlink upshifted interference signal generated by the downlink mixer 40. Second, the isolation circuit 36 blocks the downlink upshifted interference signal from the uplink signal path 74. And third, one or more filters proceeding the uplink mixer 50 in the uplink signal path 74 reject the downshifted downlink upshifted interference components that are not rejected by the downlink bandpass filter 42 or blocked by the isolation circuit 36.

That is, the filtering of the downshifted downlink upshifted interference components by the one or more filters following the uplink mixer 50 is in addition to the rejection of the downlink upshifted interference components by the downlink bandpass filter 42 and the isolation circuit 36.

Therefore, the communication circuit 70 can lower the level of isolation provided by the isolation circuit 36 by effectively dividing among the three above-described isolation techniques the job of providing electrical isolation between the downlink and uplink signal paths 72 and 74. Refer to the example described above in conjunction with FIG. 2 in which, for a given application, the isolation circuit 36 is tasked to provide 90 dB of isolation between the downlink and uplink signal paths 72 and 74. Further to this example and assuming that there is no redirected interference component, if the combined rejection of the upshifted leakage interference signal provided by the downlink bandpass filter 42 and the one or more uplink bandpass filters is 70 dB, then the isolation circuit 36 is tasked with providing only the remaining 20 dB of isolation for the communication circuit 70 to achieve the design specification of 90 dB isolation between the downlink signal path 72 and the uplink signal path 74.

Lowering the level of isolation that the isolation circuit 36 is tasked to provide can relax the design requirements of the isolation circuit 36, and, therefore, can reduce one or more of the cost, size, and design complexity of the isolation circuit 36.

Operation of the uplink signal path 74, while the uplink signal path 74 is idle (e.g., is not receiving and conditioning an uplink signal, or otherwise while the downlink signal path 72 is conditioning and transmitting a downlink signal), is described below in conjunction with FIG. 11.

Still referring to FIGS. 4-6, alternate embodiments of the communication circuit 70 are contemplated. For example, the components of the communication circuit 70 can be distributed among a remote antenna unit 14 (FIG. 1), the master unit 18 (FIG. 1), one or more intermediate units 24 (FIG. 1), and one or more base stations 12 (FIG. 1) in any suitable manner. Furthermore, the downlink-idle local oscillator 82 can be omitted, and the downlink-active local oscillator 80 can be, for example, a voltage-controlled or a numerically controlled oscillator that is configured to generate, in response to the control circuit 76, oscillator signals at the frequencies $f_{LO\_DL\_Active}$ and $f_{LO\_DL\_Idle}$; that is, the local oscillator 80 can be configured to generate oscillator signals during both the downlink-active and the downlink-idle periods. Moreover, the communication circuit 70 can be configured to shift the downlink interference signal to a frequency band that is lower than (instead of higher than) the frequency band 92 of an upshifted downlink signal and the frequency band 98 of a received uplink signal. In addition, instead of frequency shifting the downlink interference signal with the uplink mixer 50, the circuit 70 can shift the frequency of the downlink interference signal in another manner, such as by changing a sampling frequency (for example, changing a sampling frequency of an ADC) in the downlink signal path 72. Furthermore, one or more of the described components can be omitted from the communication circuit 70, and one or more other components can be added to the communication circuit 70. For example, the isolation circuit 36 can be omitted such that each of the downlink signal path 72 and uplink signal path 74 has a respective antenna as described above in conjunction with FIG. 3. Moreover, the isolation circuit 36 may not be a single circuit or component, but can be a combination of multiple circuits and components. In addition, the control circuit 76 and the sensor 78 can be omitted, and one or more of a base station 12 (FIG. 1), the master unit 18 (FIG. 1), or an intermediate unit 24 (FIG. 1) can be configured to perform the above-described functions attributed to the control circuit 76 and the sensor 78. Furthermore, embodiments described in conjunction with FIGS. 1-3 and 7-11 may be applicable to the communication circuit 70.

FIG. 7 is a diagram of a single-pole-double-throw electronic switch circuit 100, which can be used as, or as part of, the isolation circuit 36 of FIG. 4, according to an embodiment. The switch circuit 100 includes a first conduction node 102 configured for coupling to an output node of the downlink amplifier 44 (FIG. 4) of the downlink signal path 72 (FIG. 4), a second conduction node 104 configured for coupling to an input node of the uplink amplifier 48 (FIG. 4) of the uplink signal path 74 (FIG. 4), and a third conduction node 106 configured for coupling to the antenna 38 (FIG. 4). Also, the switch circuit 100 can include a control node 108 configured for coupling to the control circuit 76 (FIG. 4).

Referring to FIGS. 4 and 7, operation of the switch circuit 100 is described according to an embodiment. In response to the sense signal generated by the sensor 78 having the first value to indicate a downlink signal is present at an input node of the downlink mixer 40, the control circuit 76 causes the switch circuit 100 to couple the downlink signal path 72 to the antenna 38, and to uncouple the antenna 38 from the uplink signal path 74. Conversely, in response to the sense signal generated by the sensor 78 having the second value to indicate a downlink signal is absent from an input node of the downlink mixer 40 (e.g., to indicate that the downlink signal path 72 is idle), the control circuit 76 causes the switch circuit 100 to uncouple the downlink signal path 72 from the antenna 38, and to couple the antenna 38 to the uplink signal path 74.

Still referring to FIG. 7, alternate embodiments of the switch circuit 100 are contemplated. For example, embodiments described in conjunction with FIGS. 1-6 and 8-11 may be applicable to the switch circuit 100.

FIG. 8 is a diagram of a circulator circuit 110, which can be used as, or as part of, the isolation circuit 36 of FIG. 4, according to an embodiment. The circulator circuit 110 includes a downlink node 112 configured for coupling to an output node of the downlink amplifier 44 (FIG. 4) of the downlink signal path 72 (FIG. 4), an uplink node 114 configured for coupling to an input node of the uplink amplifier 48 (FIG. 4) of the uplink signal path 74 (FIG. 4), and an antenna node 116 configured for coupling to the antenna 38 (FIG. 4).

Referring to FIGS. 4 and 8, operation of the circulator circuit 110 is described according to an embodiment. During a downlink-active period, the circulator circuit 110 couples a downlink signal from the downlink signal path 72 to the antenna 38, and electrically isolates the uplink signal path 74 from the downlink signal path. Conversely, during a downlink-idle period, the circulator circuit 110 couples an uplink signal received by the antenna 38 to the uplink signal path 74, and electrically isolates the uplink signal path 74 from the downlink signal path 72.

Still referring to FIG. 8, alternate embodiments of the circulator circuit 110 are contemplated. For example, embodiments described in conjunction with FIGS. 1-7 and 9-11 may be applicable to the circulator circuit 110.

Figure 9:
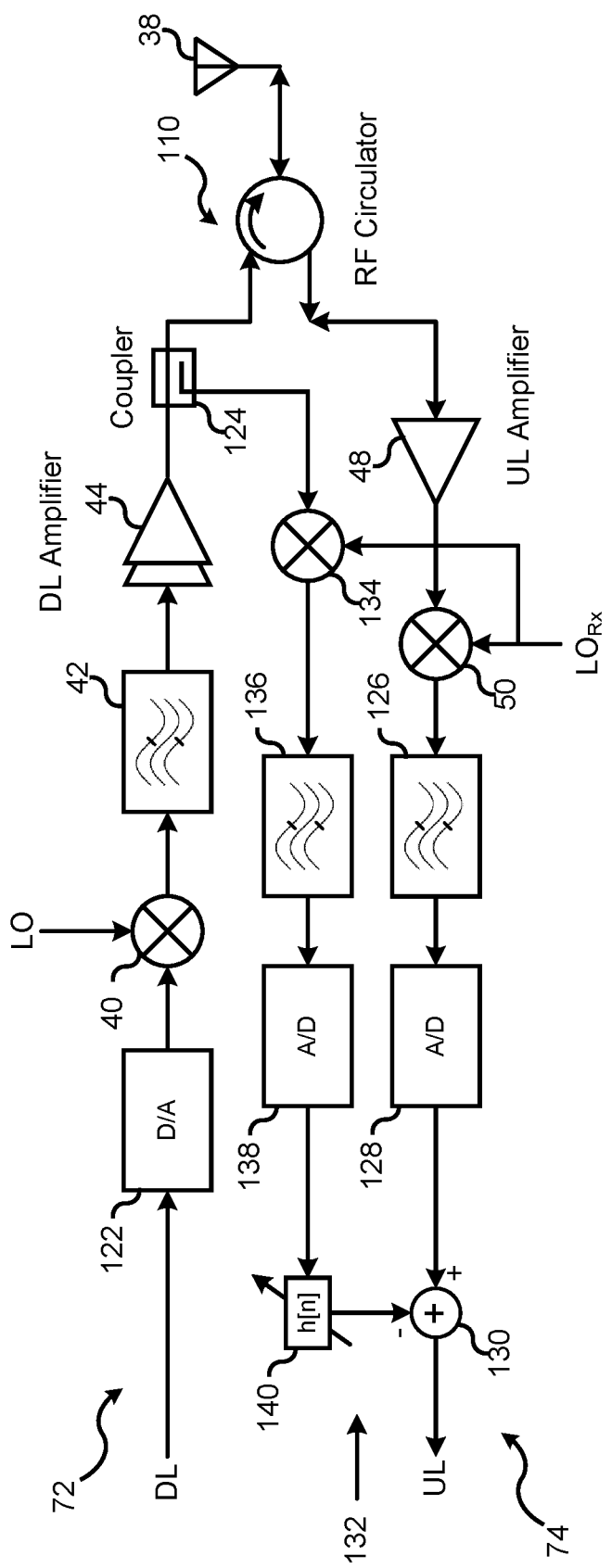
FIG. 9 is a diagram of a communication circuit of a remote antenna unit of FIG. 1, where the communication circuit is configured to implement frequency-shifting, passive, and active isolation, according to an embodiment.

FIG. 9 is a diagram of a communication circuit 120 of a remote antenna unit 14 (FIG. 1), according to an embodiment and in which like numerals reference components common to FIGS. 4, 7, and 8.

In addition to including an isolation circuit (here, the circulator circuit 110 of FIG. 8) and to being configured to implement the downlink-interference-frequency-shifting technique described above in conjunction with FIGS. 4-6, the communication circuit 120 is configured to dynamically cancel, from the uplink signal path 74, a second downlink interference signal that is, after upshifting by the downlink mixer 40 during the downlink idle mode and after downshifting by the uplink mixer 50 during the uplink active mode, in the same intermediate-frequency (IF) band as the uplink signal.

As described above in conjunction with FIG. 4, while the downlink signal path 72 is idle, the downlink signal path 72 may generate, on the input side of the downlink mixer 40, a first downlink interference signal that is within the IF passband of the downlink and uplink signals (assuming that the $DL_{\_active}$ oscillator 80 (FIG. 4) and the $UL_{\_active}$ oscillator 52 (FIG. 4) have approximately the same frequency, as they do in the above-described embodiment). But the downlink mixer 40 is configured to shift (i.e., upshift or downshift) the frequencies of the first downlink interference signal out of the radio-frequency (RF) passbands of the downlink and uplink signals as described above in conjunction with FIGS. 4-6. Consequently, the downlink bandpass filter 42 rejects most or all of the frequency-shifted, out-of-band first downlink interference signal, and any component of the frequency-shifted, out-of-band first downlink interference signal that the downlink bandpass filter 42 does not reject is rejected by the uplink bandpass filter 126. Said another way, the uplink bandpass filter 126 further rejects the frequency-shifted, out-of-band first downlink interference signal that the downlink bandpass filter 42 already rejected.

But while frequency shifting the first downlink interference signal out of the RF passbands of the downlink and uplink signals, the mixer 40 may also shift a second downlink interference signal into the RF passbands of the downlink and uplink signals. The downlink signal path 72 may generate, at the input side of the downlink mixer 40, both the first and the second downlink interference signals. As described above and in conjunction with FIGS. 4-6, the first downlink interference signal is within the IF passbands of the downlink and uplink signals. However, the second downlink interference signal, which typically has a lower power than the first downlink interference signal, is outside of the IF passbands of the downlink and uplink signals. Unfortunately, while the downlink mixer 40 is frequency shifting the first downlink interference signal out of the RF passbands of the downlink and uplink signals, the downlink mixer 40 also may be frequency shifting the second downlink interference signal into the RF passbands of the downlink and uplink signals.

Consequently, as described below, the communication circuit 120 is configured not only to reduce, in the uplink signal, interference caused by the first downlink interference signal, but is also configured to reduce, in the uplink signal, interference caused by the second downlink interference signal.

In addition to the downlink mixer 40, downlink bandpass filter 42, and downlink amplifier 44, the downlink signal path 72 includes a DAC 122 and a signal coupler 124. For clarity, the downlink-active and downlink-idle local oscillators 80 and 82 (FIG. 4) are omitted from FIG. 9, but at least the oscillator 80 is present in the communication circuit 120.

In addition to the uplink amplifier 48 and the uplink mixer 50, the uplink signal path 74 includes an uplink bandpass filter 126, an uplink ADC 128, and an uplink summer 130.

For clarity, the uplink-active and uplink-idle local oscillators 52 and 84 (FIG. 4) are omitted from FIG. 9, but at least the oscillator 52 is present in the communication circuit 120.

The communication circuit 120 also includes an interference-cancellation (also called an interference-compensation) path 132, which includes an interference mixer 134 matched to the uplink mixer 50, an interference bandpass filter 136 matched to the uplink bandpass filter 126, a cancellation ADC 138 matched to the uplink ADC 128, and an adjustable-gain-and-phase circuit 140.

Operation of the communication circuit 70 during contemporaneous downlink idle and uplink active periods is described below, according to an embodiment.

As described above in conjunction with FIG. 4, the downlink signal path 72 generates, at an output node of the downlink amplifier 44, a frequency-upshifted first downlink interference signal, which is outside of the RF passbands of the downlink and uplink signals, and a frequency-upshifted second downlink interference signal, which is within the RF passbands of the downlink and uplink signals.

Also as described above in conjunction with FIG. 4, the uplink signal path 74 receives, at an input node of the uplink amplifier 48, an uplink signal on which is superimposed leakage components (received via leakage through the circulator circuit 110) and redirected components (received by the antenna 38 via a redirection of the first and second downlink upshifted interference signals by an environmental object) of the first and the second downlink upshifted interference signals, respectively.

Further as described in conjunction with FIG. 4, the frequency upshifting, by the downlink mixer 40, of the first downlink interference signal allows the uplink bandpass filter 126 to reject the leakage and redirected components of the first downlink upshifted interference signal, because, as described above, the downlink mixer 40 shifts the frequencies of the first downlink interference signal outside of the RF passband of the uplink signal, and, therefore, outside of the passband of the uplink bandpass filter 126.

But the uplink bandpass filter 126 may be unable to reject the leakage and redirected components of the second downlink upshifted interference signal because, as described above, the downlink mixer 40 shifts the frequencies of the second downlink interference signal inside of the RF passband of the uplink signal. Therefore, the components of the second downlink upshifted interference signal pass through the uplink bandpass filter 126 and to and through the ADC 128.

It is the components of the second downlink interference signal that the interference-cancellation path 132 cancels, partially or fully, from the portion of the uplink signal path 74 following the ADC 128.

The coupler 124 couples the second downlink upshifted interference signal at the output of the downlink amplifier 44 to the cancellation mixer 134, which is matched (e.g., in one or more signal-mixing characteristics) to, and which receives the same oscillator signal as, the uplink mixer 50.

Therefore, the cancellation mixer 134 downshifts the frequencies of the second downlink upshifted interference signal to a frequency band having approximately the same center frequency as the downshifted uplink signal at the input to the uplink bandpass filter 126.

Next, the cancellation bandpass filter 136, which is matched (e.g., in bandwidth, phase shift, and gain/attenuation) to the uplink bandpass filter 126, filters the downshifted second downlink interference signal such that the downshifted second downlink interference signal at the output of the cancellation bandpass filter occupies approximately the same frequency band as the filtered downshifted uplink signal at the output node of the uplink bandpass filter.

Then, the cancellation ADC 138, which is matched (e.g., in resolution, sample rate, dynamic range) to the uplink ADC 128, converts the filtered analog second downlink interference signal into a digital interference signal that has approximately the same characteristics (e.g., quantization error, resolution, frequency band) as the digital uplink signal that the uplink ADC generates in response to the filtered analog uplink signal from the uplink bandpass filter 126.

So, from the input nodes of the uplink and cancellation mixers 50 and 134 to the output nodes of the uplink and cancellation ADCs 128 and 138, the uplink signal with components of the second downlink interference signal superimposed thereon, and the second downlink interference signal that the coupler 124 couples from the downlink signal path 72, experience approximately the same signal conditioning due to the correspondence and matching of the mixers 50 and 134, filters 126 and 136, and ADCs 128 and 138 in the uplink and cancellation paths 74 and 132, respectively.

But the components of the second downlink interference signal superimposed on the uplink signal have experienced additional conditioning by virtue of being coupled to the uplink signal path 74 via leakage through the isolation circulator circuit 110 and via redirection to and through the antenna 38 and the isolation circulator circuit 110.

Therefore, the adjustable-gain-and-phase circuit 140 is configured to impart, to the digital second downlink interference signal from the cancellation ADC 138, a phase adjustment and a gain adjustment that effectively mimic the result of the additional conditioning experienced by the components of the second downlink interference signal superimposed on the uplink signal such that, at least ideally, the phase-and-gain-adjusted digital second downlink interference signal equals the sum of the components of the digital second downlink interference signal superimposed on the digital uplink signal. The adjusted digital second downlink interference signal that the circuit 140 generates can be called a digital cancellation signal. Furthermore, in an embodiment the frequency response of the circuit 140 is configurable to replicate more accurately the channel that the uplink signal and superimposed components of the second downlink interference signal experience.

The summer 130 subtracts the digital cancellation signal from the digital uplink signal with the components of the second downlink interference signal superimposed thereon.

If the digital cancellation signal equals the sum of the components of the second downlink interference signal superimposed on the uplink signal, then the signal resulting from the subtraction and appearing at an output node of the summer 130 is the uplink signal with the components of the first and second downlink interference signals removed; that is, at least ideally, the components of the first and second downlink interference signals are no longer superimposed on the uplink signal at the output of the summer.

Even if the digital cancellation signal does not equal the sum of the components of the second downlink interference signal superimposed on the uplink signal, the magnitudes of these interference components superimposed on the uplink signal output from the summer 130 are typically less than the magnitudes of these same interference components superimposed on the digital uplink signal input to the summer. Therefore, even if the cancellation path 132 does not provide perfect cancellation, the cancellation path still provides a level of isolation in addition to the isolation provided by the frequency upshifting of the first downlink interference signal by the downlink signal path 72 and by the RF circulator circuit (or other isolation circuit) 110. For example, such additional isolation that the cancellation path 132 provides can be in an approximate range of 25 dB to 30 dB.

The phase and gain adjustments that the adjustable-gain-and-phase circuit 140 makes to the digital second downlink interference signal from the cancellation ADC 138 can be set, for example, during installation of the DAS 10 (FIG. 1) and can remain fixed thereafter, or the communication circuit 120, in cooperation with other circuitry, can be configured to dynamically alter the gain and phase adjustments that the circuit 140 imparts to the digital second downlink interference signal from the ADC 138. For example, the adjustable-gain-and-phase circuit 140 can be part of a negative-feedback loop (not shown in FIG. 9) that dithers one or both of the phase and gain adjustments, determines the magnitude of the digital uplink signal after it propagates from the summer 130, and moves one or both of the gain and phase adjustments to respective levels that minimize a magnitude of the post-summer digital uplink signal. The theory of this dithering technique is that the magnitude of the post-summer uplink signal is at a minimum in response to maximum cancellation of the components of the second downlink interference signal superimposed on the digital uplink signal.

A communication circuit that includes a cancellation path similar to the cancellation path 132 is described in U.S. Pat. No. 10,205,481 (see, for example, FIG. 7), which is incorporated by reference.

Still referring to FIG. 9, alternate embodiments of the communication circuit 120 are contemplated. For example, the communication circuit 120 can include an isolation circuit other than, or in addition to, the RF circulator circuit 110. Furthermore, embodiments described in conjunction with FIGS. 1-8 and 10-11 may apply to the communication circuit 120.

Figure 10:
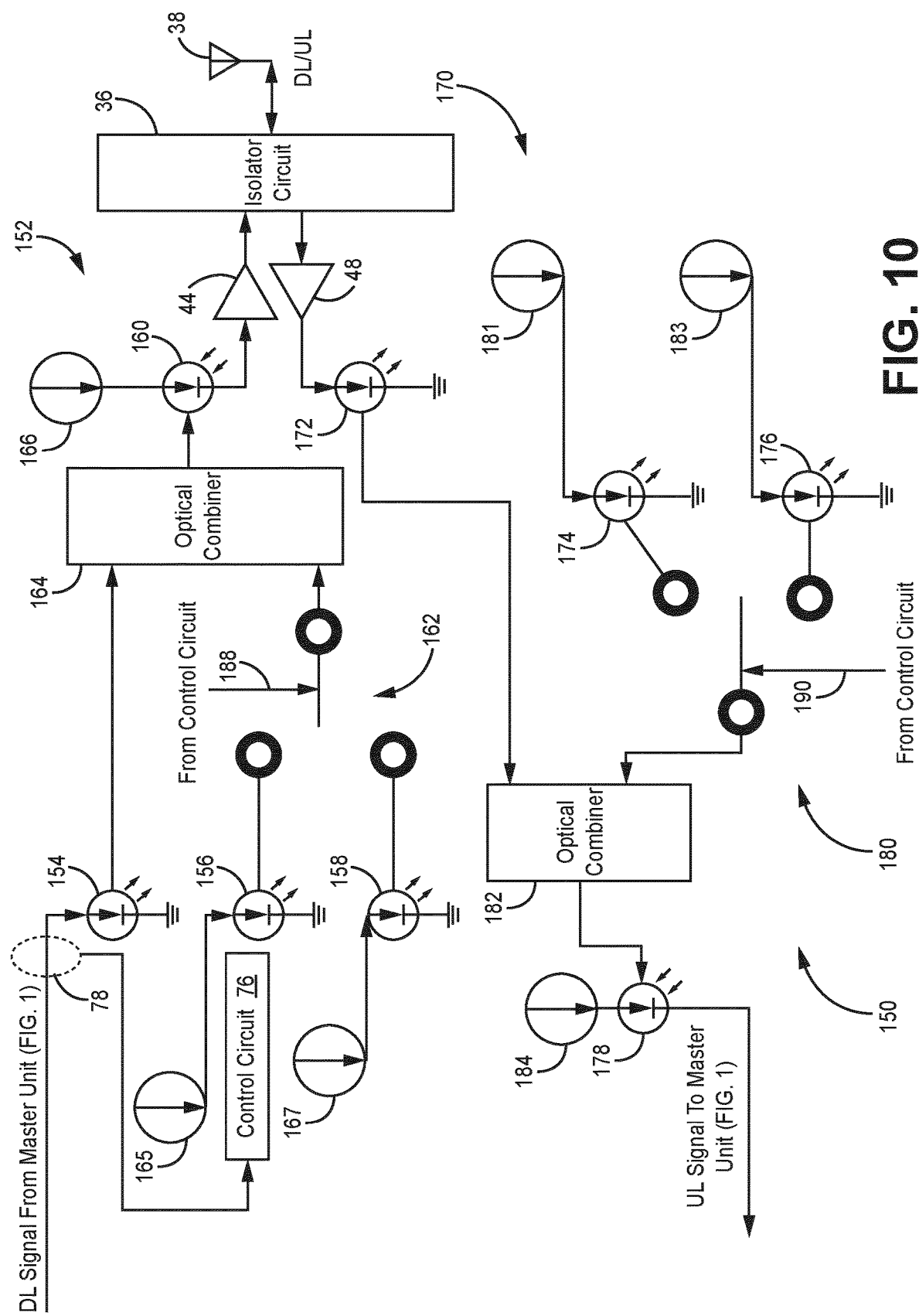
FIG. 10 is a diagram of a communication circuit of a remote antenna unit of FIG. 1, where the communication circuit is configured to implement frequency-shifting isolation in the optical domain, according to an embodiment.

FIG. 10 is a diagram of a communication circuit 150 of a remote antenna unit 14 (FIG. 1), according to an embodiment and in which like numerals reference components common to FIGS. 4 and 7-9. Like the communication circuits 70 of FIG. 4 and 120 of FIG. 9, the communication circuit 150 shifts (e.g., upshifts) the frequencies of a downlink interference signal during idle periods of the downlink signal path 152 to isolate the uplink signal path 170 from the downlink interference signal. But unlike the communication circuits 70 of FIG. 4 and 120 of FIG. 9, the communication circuit 150 performs at least some functions in the optical domain instead of in the electrical domain.

In addition to the isolation circuit 36, the antenna 38, and the downlink amplifier 44, a downlink signal path 152 of the communication circuit 150 includes laser diodes 154, 156, and 158, photodiode 160, a switch circuit 162, an optical-signal combiner 164, and current sources 165, 166, and 167. Although omitted from FIG. 10 for clarity, the downlink signal path 152 can also include the downlink bandpass filter 42 (FIG. 4) coupled between a cathode of the photodiode 160 and an input node of the downlink amplifier 44.

And in addition to the uplink amplifier 48, an uplink signal path 170 of the communication circuit 150 includes laser diodes 172, 174, and 176, photodiode 178, a switch circuit 180, an optical-signal combiner 182, and current sources 181, 183, and 184. In addition to the downlink signal path 152 and the uplink signal path 170, the communication circuit 150 includes the control circuit 76 and the sensor 78.

Still referring to FIG. 10, operation of the communication circuit 150 is described according to an embodiment.

During a downlink-active mode, the laser diode 154 receives, from the master unit 18 (FIG. 1), an electrical intermediate downlink signal having a center frequency $f_{DL}$, and converts the intermediate downlink signal into an optical downlink signal.

In response to the electrical intermediate downlink signal propagating along the downlink signal path 152 to the laser diode 154, the sensor 78 generates a sense signal having a first value that indicates the detection of the intermediate downlink signal by the sensor 78.

In response to the sense signal having the first value, the control circuit 76 causes the switch circuit 162 to couple the laser diode 156 to the downlink combiner 164 (the control circuit 76 controls the switch circuit 162 via a control node 188 of the switch circuit 162).

The laser diode 156, acting as a local optical oscillator, generates an optical oscillator signal having a frequency such that the difference between the frequencies of the laser diode 154 and the laser diode 156 approximately equals $f_{LO\_DL\_Active}$.

The optical-signal combiner 164 combines the optical downlink and optical oscillator signals from the laser diodes 154 and 156, respectively, onto a single optical path.

The current source 166 generates a bias current to the photodiode 160, which, due to its nonlinear characteristics, effectively mixes the optical intermediate downlink signal with the optical local-oscillator signal to generate a frequency-upshifted electrical downlink signal having a center frequency equal to $f_{DL}+f_{LO\_DL\_Active}$.

If the downlink bandpass filter 42 (FIG. 4) is present, then it filters the upshifted downlink signal from the photodiode 160 to remove any out-of-band frequencies (e.g., frequencies not in the frequency band of the upshifted downlink signal) such that the upshifted electrical downlink signal occupies the frequency band 92 of FIG. 5.

The downlink amplifier 44 amplifies the filtered downlink signal from the downlink bandpass filter 42 (or, if the downlink bandpass filter is absent, the downlink amplifier 44 amplifies the upshifted downlink signal from the photodiode 160). The isolation circuit 36 passes the amplified downlink signal from the downlink amplifier 44 to the antenna 38, and electrically isolates the uplink signal path 170 from the downlink signal path 152. And the antenna 38 radiates the amplified downlink signal.

Operation of the uplink signal path 170 while the downlink signal path 152 is active is described below in conjunction with FIG. 11.

Still referring to FIG. 10, during a downlink-idle period, the laser diode 154 receives no intermediate downlink signal from the master unit 18 (FIG. 1) In response to the intermediate downlink signal being absent from the portion of the downlink signal path 152 preceding the laser diode 154, the sensor 78 generates the sense signal having the second value that indicates the detection of a lack of an intermediate downlink signal by the sensor 78.

In response to the sense signal having the second value, the control circuit 76 causes the switch circuit 162 to uncouple the laser diode 156 from the optical combiner 164 and to couple the laser diode 158 to the optical combiner 164.

The optical combiner 164 combines an optical interference signal from the laser diode 154 and the optical downlink-idle-oscillator signal from the laser diode 158 onto a single optical path that is coupled to the photodiode 160.

For reasons similar to those described above in conjunction with the communication circuit 30 of FIG. 2, the photodiode 160 (biased by the current source 166) effectively mixes an optical interference signal on the downlink signal path 152 and having a modulated center frequency $f_{interference}$ with the optical local-oscillator signal having a frequency such that the difference of frequencies between the laser 154 and the laser 158 corresponds to $f_{LO\_DL\_Idle}$, and generates an electrical interference signal that is upshifted to a center frequency equal to $f_{noise}+f_{LO\_DL\_Idle}$. Because $f_{LO\_DL\_Idle}$ is greater than $f_{LO\_DL\_Active}$, the frequency band 94 (FIG. 5) of the interference signal is significantly higher in frequency than the frequency band 92 (FIG. 5) of an upshifted downlink signal that the downlink signal path 152 generates while the downlink signal path 152 is actively conditioning and transmitting a downlink signal.

If a downlink bandpass filter 42 is present between the cathode of the photodiode 160 and an input node of the downlink amplifier 44, the downlink bandpass filter 42 (FIG. 4) has a passband approximately equal to the frequency band 92 (FIG. 5) of an upshifted downlink signal generated by the downlink signal path 152 during a downlink active period. Because the frequency band 94 (FIG. 5) of the interference signal is significantly higher in frequency than the frequency band 92, the downlink bandpass filter 42 rejects a significant portion of the power of the upshifted interference signal.

The downlink amplifier 44 amplifies the reduced-power filtered electrical interference signal that passes from the photodiode 160 through the downlink bandpass filter 42. The isolation circuit 36 passes the amplified interference signal from an output node of the downlink amplifier 44 to the antenna 38, and electrically isolates the uplink signal path 170 from the downlink signal path 152. Also, the antenna 38 radiates the amplified interference signal, which, as shown in FIG. 5, occupies the frequency band 94.

Still referring to FIG. 10, during an uplink active mode, the uplink signal path 170 further rejects any received downlink upshifted interference components generated by the idle downlink signal path 152.

There are two sources from which the uplink signal path 170 can receive a respective component of the downlink interference signal: 1) leakage of downlink interference through the isolation circuit 36, which, as described above, may provide imperfect isolation, and 2) a redirection, by an object in the environment back to the antenna 38, of a component of the downlink interference that the antenna 38 radiated.

For example purposes, it is assumed that the uplink signal path 170 receives, from both of these sources, respective leakage and redirected downlink interference components superimposed on an uplink signal. But the below description and analysis is similar even if the uplink signal path 170 receives a downlink interference component from only one of these sources.

The antenna 38 receives an uplink signal on which is superimposed a redirected component of the downlink interference signal. The isolation circuit 36 passes the uplink signal on which is superimposed the redirected component of the downlink interference signal to an input node of the uplink amplifier 48. Furthermore, a leakage component of the downlink interference signal "leaks" through the isolation circuit 36 to the input node of the uplink amplifier 48. Therefore, the uplink amplifier 48 receives, at its input node, and amplifies, an uplink signal on which is superimposed both the redirected and leakage components of the downlink interference signal.

Referring to FIG. 6, the uplink signal occupies the frequency band 98, which is centered at a frequency $f_{UL}+f_{LO\_UL\_Active}$, where $f_{LO\_UL\_Active} \approx f_{LO\_DL\_Active}$, but the redirected and leakage components of the downlink upshifted interference signal occupy the frequency band 94, which is at a significantly higher frequency than the frequency band 98. For example, the separation between the center frequencies of the bands 94 and 98 is 2.8 GHz.

For clarity, although it is not shown, in FIG. 10, the UL signal, centered at $f_{UL}+f_{LO\_UL\_active}$, is down shifted to $f_{UL}$ before it is converted into an optical signal by the laser diode 172. Although not shown in FIG. 10, the communication circuit 150 can include circuitry for performing other possible processing, such as predistortion processing, of the wanted RF signals.

The laser diode 172 converts the amplified and down shifted uplink signal on which is superimposed the redirected and leakage components of the downlink interference signal into an optical uplink signal. The laser diode 174 generates an optical uplink-active oscillator signal, and the switch circuit 180, in response to a control signal from the control circuit 76 on a control node 190, couples the optical uplink-active oscillator signal to the optical-signal combiner 182. The combiner 182 combines the optical uplink signal from the laser diode 172 and the optical uplink-active oscillator signal from the laser diode 174 (via the switch circuit 180) onto a single optical path.

The use of the laser diode 174 allows generation, at the output of the photodiode 178, an upshifted electrical signal at the original center frequency $f_{UL}+f_{LO\_UL\_active}$. This can be accomplished by setting the frequencies of the lasers 172 and 174 such that the difference between these frequencies approximately equals $f_{LO\_UL\_active}$. That is, the photodiode 178 effectively upshifts the frequencies of the uplink signal and the components of the downlink interference signal such that the upshifted uplink signal occupies a frequency band 98 (FIG. 6) centered at $f_{UL}+f_{LO\_UL\_active}$, and such that the upshifted interference components occupy a frequency band 94 (FIG. 6) centered at $f_{interference}+f_{LO\_DL\_Idle}$. Therefore, the center frequency of the frequency band (shown in FIG. 6) occupied by the upshifted interference components is higher than the center frequency $f_{UL}+f_{LO\_UL\_active}$ of the frequency band 98 (FIG. 6) occupied by the upshifted uplink signal by a frequency difference $f_{LO\_DL\_Idle}-f_{LO\_DL\_Active}$. As long as the difference frequency $f_{LO\_DL\_Idle}-f_{LO\_UL\_Active}$ is large enough, the one or more filters (not shown in FIG. 4) following the photodiode 178 pass the upshifted uplink signal centered at $f_{UL}+f_{LO\_UL\_active}$ and reject the components of the downlink interference signal centered at $f_{interference}+f_{LO\_DL\_Idle}$.

Still referring to FIG. 10, by upshifting the frequencies of an interference signal generated by the downlink signal path 152 to a frequency band that is higher than the frequency bands of an upshifted downlink signal and of a received uplink signal, the communication circuit 150 isolates the uplink signal path 170 from interference components generated by the downlink signal path 152 during a downlink-idle period in a manner similar to that described above in conjunction with the communication circuit 70 of FIG. 4. Such isolation also can provide the communication circuit 150 with advantages similar to those described above in conjunction with the communication circuit 70. Furthermore, the use of optical components, instead of electrical components, to perform some functions, such as oscillator-signal generation and signal mixing, can further reduce the noise and other interference generated by the downlink signal path 152 and present on the uplink signal path 170.

Operation of the uplink signal path 170 while the uplink signal path 170 is idle (e.g., is not receiving an uplink signal while the downlink signal path 152 is conditioning and transmitting a downlink signal) is described below in conjunction with FIG. 11.

Still referring to FIG. 10, alternate embodiments of the communication circuit 150 are contemplated. For example, the communication circuit 150 can perform in the optical domain one or more of the functions described as being performed in the electrical domain, and can perform in the electrical domain one or more of the functions described as being performed in the optical domain. Furthermore, although the photodiode 160 is described as upshifting the downlink signal in frequency, the photodiode 160 can downshift the downlink signal and noise in frequency by generating respective differences between the frequencies of the optical signals generated by the laser diodes 154 and 156 and generated by the laser diodes 154 and 158. For example, where the wavelengths of the signals generated by the laser diodes 154 and 156 are 1309.84 nanometers (nm) and 1310 nm, respectively, the downlink signal can be downshifted or upshifted by approximately 28 GHz). Furthermore, embodiments described in conjunction with FIGS. 1-9 and 11 may be applicable to the communication circuit 150.

Figure 11:
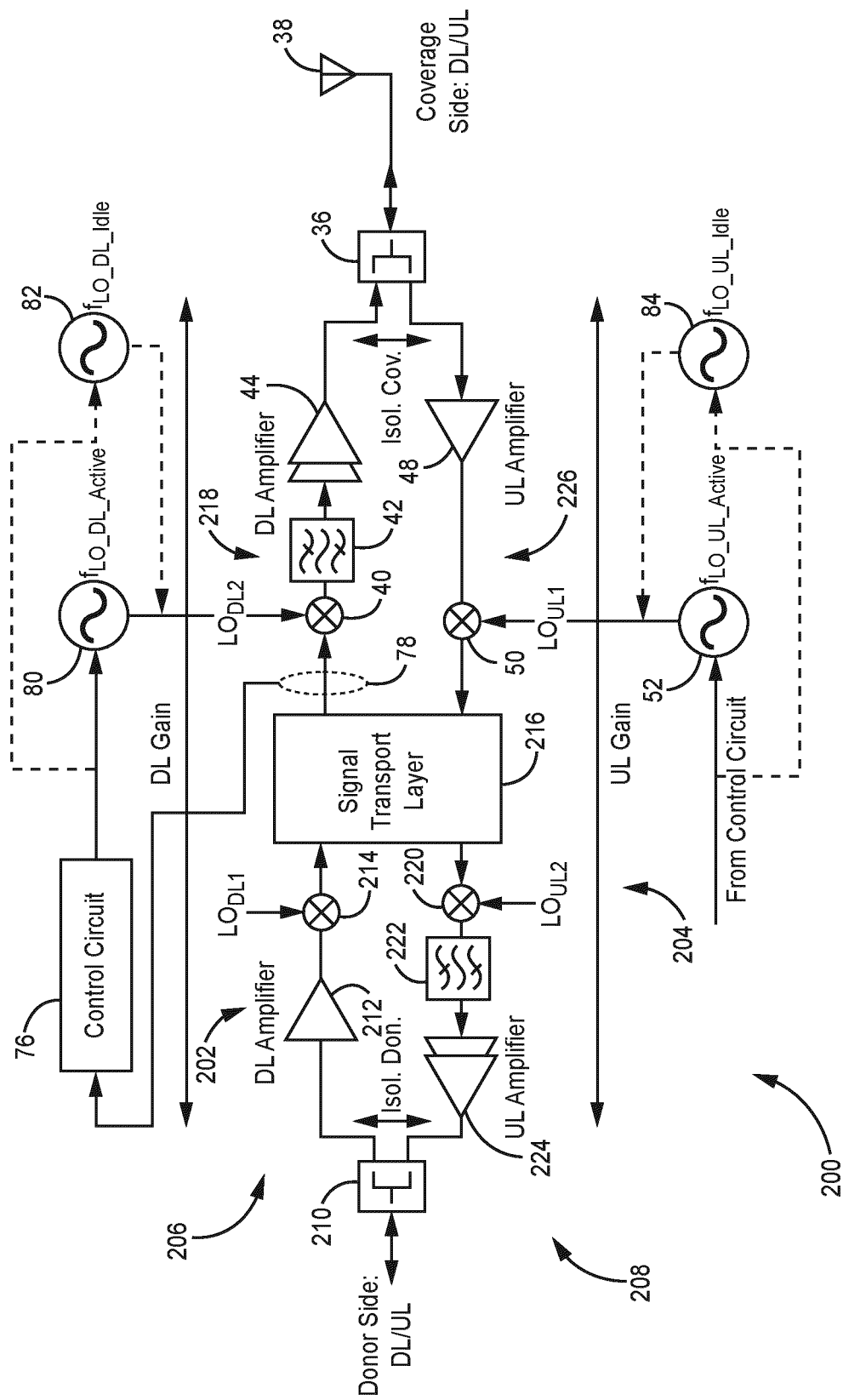
FIG. 11 is a diagram of closed loop in a communication circuit of a remote antenna unit of FIG. 1, where the closed loop is formed by a downlink signal path and an uplink signal path of the communication circuit, according to an embodiment.

FIG. 11 is a representative circuit diagram of a communication circuit 200 and of portions 202 and 204 of the downlink and uplink signal paths 206 and 208, respectively, that are external to the communication circuit 200, according to an embodiment; in FIG. 11 like numerals reference components common to the communication circuit of FIG. 11 and the communication circuits of FIGS. 4, 9, and 10. For example, the circuit diagram of FIG. 11 represents one or more of the communication circuits 70, 120, and 150 of FIGS. 4, 9, and 10, respectively, and represents other portions of the respective downlink and uplink signal paths 72 and 74, and 152 and 170 of FIGS. 4, 9, and 10, respectively.

Further below, operation of the uplink signal path 208 during a period in which the downlink signal path 206 is active and the uplink signal path 208 is idle is described, according to an embodiment.

In addition to the downlink mixer 40, downlink bandpass filter 42, downlink amplifier 44, isolation circuit 36, and antenna 38, the downlink signal path 206 includes, external to the communication circuit 200, another isolator circuit 210, another downlink amplifier 212, and another downlink mixer 214, and includes a signal transport layer 216, which interfaces the portion 202 of the downlink signal path 206 external to the communication circuit 200 with a portion 218 of the downlink signal path 206 that forms part of the communication circuit 200. The signal transport layer 216 can be external to the communication circuit 200, can form part of the communication circuit 200, or can include both one or more components external to the communication circuit 200 and one or more components that form part of the communication circuit 200. Furthermore, the downlink local oscillators 80 and 82 are disposed on the communication circuit 200, and may be considered part of the downlink signal path 206 or separate therefrom.

Also, in addition to the antenna 38, the isolation circuit 36, the low-noise uplink amplifier 48, and the uplink mixer 50, the uplink signal path 208 includes the signal transport layer 216 and includes, external to the communication circuit 200, another uplink mixer 220, an uplink bandpass filter 222, another uplink amplifier 224, and the other isolator circuit 210. The signal transport layer 216 interfaces the portion 204 of the uplink signal path 208 external to the communication circuit 200 with a portion 226 of the uplink signal path 208 that forms part of the communication circuit 200. As described above, the signal transport layer 216 may be external to the communication circuit 200, may form part of the communication circuit 200, or may include both one or more components external to the communication circuit 200 and one or more components that form part of the communication circuit 200. Furthermore, the uplink local oscillators 52 and 84 are disposed on the communication circuit 200, and may be considered part of the uplink signal path 208 or separate therefrom.

Furthermore, each of the control circuit 76 and the sensor 78 may be disposed on, or external to, the communication circuit 200, and the sensor 78 may be considered part of, or external to, the downlink signal path 206.

Due to signal leakage through the isolation circuits 36 and 210, and due to redirection, by an object, of a radiated downlink signal back to the antenna 38, the downlink and uplink signal paths 206 and 208 effectively form a closed loop, which, if not properly compensated, can be unstable and oscillate or ring. For example, if, at a particular frequency, the closed loop has a gain equal to or greater than unity, and has a phase shift of 360°, then the loop may oscillate at the particular frequency.

During a downlink-active period in which the downlink signal path 206 is actively conditioning and transmitting a downlink signal and during a contemporaneous uplink-idle period in which the uplink signal path 208 is inactive, and, therefore, not receiving and conditioning an uplink signal, coupling of the downlink signal to the uplink signal path 208, due to, for example, the above-described downlink-signal leakage and redirection, can cause the closed downlink-path-uplink-path loop to oscillate if the loop gain is too high.

One technique for reducing the loop gain while the uplink signal path 208 is inactive is to shift the frequencies of the components of the downlink signal received by the uplink signal path 208 out of the passband of the uplink signal path.

Referring to FIGS. 5 and 6, the frequency band 92 of the transmitted downlink signal is approximately the same as the frequency band 98 of a received uplink signal.

Therefore, during an uplink-idle period while the uplink signal path 208 is not receiving and conditioning an uplink signal, if the uplink local oscillator 52 remains active and generates an oscillator signal having a frequency $f_{LO\_UL\_Active}$, then the uplink mixer 50 effectively downshifts the received leakage and redirected components of the downlink signal to the passband of the uplink signal path 208.

If the power of the received leakage and redirected components of the downlink signal is high enough to render the loop gain unity or greater, then the loop formed by the downlink and uplink signal paths 206 and 208 may oscillate.

But to compensate for the potential increase in loop gain that the leakage and redirected components of the downlink signal can cause, the control circuit 76, in response to the sensor 78 detecting a downlink signal at the input node of the downlink mixer 40, deactivates the uplink-active local oscillator 52 and activates the uplink-idle local oscillator 84.

The uplink-idle local oscillator 84 generates an oscillator signal having a frequency $f_{LO\_UL\_Idle}$, which is different than $f_{LO\_UL\_Active}$; for example, referring to FIG. 6, the uplink-idle local oscillator 84 can generate the local oscillator signal having a frequency $f_{LO\_UL\_Idle} = f_{LO\_DL\_Idle}$.

The result of the oscillator signal having a frequency $f_{LO\_UL\_Idle}$, which is different from $f_{LO\_UL\_Active}$, is that the uplink mixer 50 shifts the frequencies of the received leakage and redirected components of the downlink signal down, up, or both down and up, and, therefore, out of the passband of the portion of the uplink signal path 208 following the uplink mixer 50.

And, as described above, shifting the frequencies of the received leakage and redirected components of the downlink signal out of the passband of the uplink signal path 208 effectively reduces the gain of the loop formed by the downlink signal path 206 and the uplink signal path 208, and, therefore, can increase the stability of the loop by lowering the loop gain to below unity.

Still referring to FIG. 11, alternate embodiments of the communication circuit 200 are contemplated. For example, embodiments described in conjunction with FIGS. 1-10 may be applicable to the communication circuit 200.

The methods and techniques described herein may be implemented in analog electronic circuitry, digital electronic circuitry, or with a programmable processor (for example, a special-purpose processor, a general-purpose processor such as a computer, a microprocessor, or microcontroller) or other circuit (for example, an FPGA), firmware, software, or in combinations of them. Apparatuses embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs). Furthermore, although described in conjunction with uplink and downlink signals for purposes of explanation, the embodiments, techniques, and concepts disclosed herein are applicable to other transmit and receive signals.

EXAMPLE EMBODIMENTS

Example 1 includes a communication circuit, comprising: a first signal path configured to carry, during a first period, a first information signal having a first frequency; and a first frequency-shifting circuit coupled to the first signal path and configured to: receive a first control signal; shift the first frequency of the first information signal by a second frequency in response to the first control signal having a first control value; and shift a third frequency of a first interference signal on the first signal path during a second period by a fourth frequency in response to the first control signal having a second control value.

Example 2 includes the communication circuit of Example 1, wherein: the first signal path includes a downlink signal path; and the first period includes a transmit period.

Example 3 includes the communication circuit of any of Examples 1-2, wherein: the first signal path includes a transmit signal path; and the first period includes a transmit period.

Example 4 includes the communication circuit of any of Examples 1-3, wherein the first frequency-shifting circuit includes a signal mixer that forms part of the first signal path.

Example 5 includes the communication circuit of any of Examples 1-4, wherein the first frequency-shifting circuit includes: a signal mixer; and an oscillator configured to: receive the control signal, provide, to the mixer, a mixing signal having the second frequency in response to the control signal having the first control value, and provide, to the mixer, the mixing signal having the fourth frequency in response to the control signal having the second control value.

Example 6 includes the communication circuit of any of Examples 1-5, wherein the first frequency-shifting circuit includes: a signal mixer; a first oscillator configured to: receive the control signal, and provide, to the mixer, a mixing signal having the second frequency in response to the control signal having the first control value; and a second oscillator configured to: receive the control signal, and provide, to the mixer, a mixing signal having the fourth frequency in response to the control signal having the second control value.

Example 7 includes the communication circuit of any of Examples 1-6, wherein: the first frequency-shifting circuit includes an output node configured to carry the frequency-shifted first information signal during the first period and the frequency-shifted interference signal during the second period; wherein the first signal path includes: a bandpass filter having an input node coupled to the output node of the first frequency-shifting circuit and having an output node; an amplifier having an input node coupled to the output node of the bandpass filter and having an output node; and an antenna coupled to the output node of the amplifier.

Example 8 includes the communication circuit of any of Examples 1-7, further comprising: a second signal path configured to carry, during the second period, a second information signal having the first frequency; and an isolation circuit coupled between the first and second signal paths.

Example 9 includes the communication circuit of any of Examples 1-8, further comprising: a second signal path configured to carry, during the second period, a second information signal having the first frequency; and a second frequency-shifting circuit coupled to the second signal path and configured to: receive a second control signal; shift the first frequency of the second information signal by a fifth frequency in response to the second control signal having a third control value; and shift a sixth frequency of a second interference signal on the second signal path during the first period by a sixth frequency in response to the second control signal having a fourth control value.

Example 10 includes the communication circuit of Example 9, wherein the second frequency-shifting circuit includes: a signal mixer; a first oscillator configured to: receive the second control signal, and provide, to the mixer, a mixing signal having the fifth frequency in response to the control signal having the third control value; and a second oscillator configured to: receive the second control signal, and provide, to the mixer, a mixing signal having the sixth frequency in response to the second control signal having the fourth control value.

Example 11 includes the communication circuit of any of Examples 1-10, further comprising: a second signal path configured to carry, during the second period, a second information signal having the first frequency; and a second frequency-shifting circuit coupled to the second signal path and configured to: receive a second control signal; shift the first frequency of the second information signal by a fifth frequency in response to the second control signal having a third control value; and shift a sixth frequency of a signal on the second signal path during the first period by a sixth frequency in response to the second control signal having a fourth control value to increase stability of a loop formed by the first and second signal paths.

Example 12 includes the communication circuit of any of Examples 1-11, wherein: the first signal path includes: an antenna configured to generate the first information signal during the first period, and an amplifier having an output node coupled to the antenna and having an input node; wherein the first frequency-shifting circuit includes an output node coupled to the input node of the amplifier and the output node configured to provide the frequency-shifted first information signal during the first period and the frequency-shifted interference signal during the second period.

Example 13 includes the communication circuit of any of Examples 1-12, further comprising: a second signal path configured to carry, during the second period, a second information signal having the first frequency and a leakage signal from the first signal path; and a compensation circuit coupled to the first signal path and configured to reduce a magnitude of the leakage signal.

Example 14 includes the communication circuit of any of Examples 1-13, wherein: the first frequency-shifting circuit is further configured to: convert the first information signal into an optical first information signal; shift the first frequency of the optical first information signal by a second optical frequency in response to the first control signal having the first control value; and shift the third frequency of an optical first interference signal on the first signal path during the second period by a fourth optical frequency in response to the first control signal having the second control value.

Example 15 includes the communication circuit of any of Examples 1-14, further comprising: a second signal path configured to carry, during the second period, a second information signal having the first frequency; and a second frequency-shifting circuit coupled to the second signal path and configured to: receive a second control signal; convert the second information signal into an optical second information signal; shift the first frequency of the optical second information signal by a fifth frequency in response to the second control signal having a third control value; and shift a sixth frequency of a second interference signal on the second signal path during the first period by a sixth frequency in response to the second signal having a fourth control value.

Example 16 includes the communication circuit of any of Examples 1-15, wherein the first interference signal includes a first noise signal.

Example 17 includes a remote antenna unit, comprising: a first signal path configured to carry, during a first period, a first information signal having a first frequency; and a first frequency-shifting circuit coupled to the first signal path and configured to: receive a first control signal; shift the first frequency of the first information signal by a second frequency in response to the first control signal having a first control value; and shift a third frequency of a first interference signal on the first signal path during a second period by a fourth frequency in response to the first control signal having a second control value.

Example 18 includes a distributed antenna system, comprising: a master unit; and at least one remote antenna unit each coupled to the master unit and including: a first signal path configured to carry, during a first period, a first information signal having a first frequency, and a first frequency-shifting circuit coupled to the first signal path and configured to: receive a first control signal; shift the first frequency of the first information signal by a second frequency in response to the first control signal having a first control value; and shift a third frequency of a first interference signal on the first signal path during a second period by a fourth frequency in response to the first control signal having a second control value.

Example 19 includes the distributed antenna system of Example 18, further comprising an intermediate unit coupled between the master unit and at least one of the at least one remote antenna unit.

Example 20 includes a communication system, comprising: a distributed antenna system, including: a master unit; at least one remote antenna unit each coupled to the master unit and including: a first signal path configured to carry, during a first period, a first information signal having a first frequency; and a first frequency-shifting circuit coupled to the first signal path and configured to: receive a first control signal; shift the first frequency of the first information signal by a second frequency in response to the first control signal having a first control value; and shift a third frequency of a first interference signal on the first signal path during a second period by a fourth frequency in response to the first control signal having a second control value; and at least one base station coupled to the distributed antenna system.

Example 21 includes a method, comprising: shifting a frequency of a signal on a signal path by a first amount; and in absence of the signal on the signal path, shifting a frequency of another signal on the signal path by a second amount.

Example 22 includes the method of Example 21, wherein: the signal includes a downlink signal; and the signal path includes a downlink transmitting path.

Example 23 includes the method of any of Examples 21-22, wherein: the signal includes an uplink signal; and the signal path includes an uplink receiving path.

Example 24 includes the method of any of Examples 21-23, wherein: the signal includes a transmit signal; and the signal path includes a transmitting path.

Example 25 includes the method of any of Examples 21-24, wherein: the signal includes a receive signal; and the signal path includes a receiving path.

Example 26 includes the method of any of Examples 21-25, wherein the other signal includes an interference signal.

Example 27 includes the method of any of Examples 21-26, wherein the other signal includes a noise signal.

Example 28 includes the method of any of Examples 21-27, wherein the other signal includes a downlink signal generated by another signal path.

Example 29 includes the method of any of Examples 21-28, wherein the other signal includes a downlink signal generated by another signal path that is part of a same communication circuit as the signal path.

Example 30 includes the method of any of Examples 21-29, wherein the other signal includes a transmit signal generated by another signal path.

Example 31 includes the method of any of Examples 21-30, wherein the other signal includes a transmit signal generated by another signal path that is part of a same communication circuit as the signal path.

Example 32 includes a tangible, non-transitory readable medium storing instructions that, when executed by one or more computing circuits, cause at least one of the one or more computing circuits, or another circuit controlled by at least one of the one or more computing circuits: to shift a frequency of a signal on a signal path by a first amount; and in response to an absence of the signal on the signal path, to shift a frequency of another signal on the signal path by a second amount.

A number of embodiments defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A communication circuit, comprising:
a first signal path configured to carry, during a first period, a first information signal having a first frequency; and
a first frequency-shifting circuit coupled to the first signal path and configured to:
receive a first control signal;
shift the first frequency of the first information signal by a second frequency in response to the first control signal having a first control value; and
shift a third frequency of a first interference signal on the first signal path during a second period by a fourth frequency in response to the first control signal having a second control value;
wherein the first frequency-shifting circuit includes an output node configured to carry the frequency-shifted first information signal during the first period and the frequency-shifted interference signal during the second period;
wherein the first signal path includes:
a bandpass filter having an input node coupled to the output node of the first frequency-shifting circuit and having an output node;
an amplifier having an input node coupled to the output node of the bandpass filter and having an output node; and
an antenna coupled to the output node of the amplifier.

2. The communication circuit of claim 1, wherein:
the first signal path includes a downlink signal path; and
the first period includes a transmit period.

3. The communication circuit of claim 1, wherein:
the first signal path includes a transmit signal path; and
the first period includes a transmit period.

4. The communication circuit of claim 1, wherein the first frequency-shifting circuit includes a signal mixer that forms part of the first signal path.

5. The communication circuit of claim 1, wherein the first frequency-shifting circuit includes:
a signal mixer; and
an oscillator configured to:
receive the control signal,
provide, to the mixer, a mixing signal having the second frequency in response to the control signal having the first control value, and
provide, to the mixer, the mixing signal having the fourth frequency in response to the control signal having the second control value.

6. The communication circuit of claim 1, wherein the first frequency-shifting circuit includes:
a signal mixer;
a first oscillator configured to:
receive the control signal, and
provide, to the mixer, a mixing signal having the second frequency in response to the control signal having the first control value; and
a second oscillator configured to:
receive the control signal, and
provide, to the mixer, a mixing signal having the fourth frequency in response to the control signal having the second control value.

7. The communication circuit of claim 1, further comprising:
a second signal path configured to carry, during the second period, a second information signal having the first frequency; and
an isolation circuit coupled between the first and second signal paths.

8. The communication circuit of claim 1, further comprising:
a second signal path configured to carry, during the second period, a second information signal having the first frequency; and
a second frequency-shifting circuit coupled to the second signal path and configured to:
receive a second control signal;
shift the first frequency of the second information signal by a fifth frequency in response to the second control signal having a third control value; and
shift a sixth frequency of a second interference signal on the second sig path during the first period by a sixth frequency in response to the second contr signal having a fourth control value.

9. The communication circuit of claim 8, wherein the second frequency shifting circuit includes:
a signal mixer;
a first oscillator configured to:
receive the second control signal, and
provide, to the mixer, a mixing signal having the fifth frequency in response to the control signal having the third control value; and
a second oscillator configured to:
receive the second control signal, and
provide, to the mixer, a mixing signal having the sixth frequency in response to the second control signal having the fourth control value.

10. The communication circuit of claim 1, further comprising:
a second signal path configured to carry, during the second period, a second information signal having the first frequency; and
a second frequency-shifting circuit coupled to the second signal path and configured to:
receive a second control signal;
shift the first frequency of the second information signal by a fifth frequency in response to the second control signal having a third control value; and
shift a sixth frequency of a signal on the second signal path during the first period by a sixth frequency in response to the second control signal having a fourth control value to increase stability of a loop formed by the first and second signal paths.

11. The communication circuit of claim 1, wherein:
the first signal path includes:
an antenna configured to generate the first information signal during the first period, and
an amplifier having an output node coupled to the antenna and having an input node;
wherein the first frequency-shifting circuit includes an output node coupled to the input node of the amplifier and the output node configured to provide the frequency-shifted first information signal during the first period and the frequency-shifted interference signal during the second period.

12. The communication circuit of claim 1, further comprising:
a second signal path configured to carry, during the second period, a second information signal having the first frequency and a leakage signal from the first signal path; and
a compensation circuit coupled to the first signal path and configured to reduce a magnitude of the leakage signal.

13. The communication circuit of claim 1, wherein:
the first frequency-shifting circuit is further configured to:
convert the first information signal into an optical first information signal;
shift the first frequency of the optical first information signal by a second optical frequency in response to the first control signal having the first control value; and
shift the third frequency of an optical first interference signal on the first signal path during the second period by a fourth optical frequency in response to the first control signal having the second control value.

14. The communication circuit of claim 1, further comprising:
a second signal path configured to carry, during the second period, a second information signal having the first frequency; and
a second frequency-shifting circuit coupled to the second signal path and configured to:
receive a second control signal;
convert the second information signal into an optical second information signal;
shift the first frequency of the optical second information signal by a fifth frequency in response to the second control signal having a third control value; and
shift a sixth frequency of a second interference signal on the second signal path during the first period by a sixth frequency in response to the second signal having a fourth control value.

15. The communication circuit of claim 1, wherein the first interference signal includes a first noise signal.

16. A remote antenna unit, comprising:
a first signal path configured to carry, during a first period, a first information signal having a first frequency; and
a first frequency-shifting circuit coupled to the first signal path and configured to:
receive a first control signal;
shift the first frequency of the first information signal by a second frequency in response to the first control signal having a first control value; and
shift a third frequency of a first interference signal on the first signal path during a second period by a fourth frequency in response to the first control signal having a second control value;
a second signal path configured to carry, during the second period, a second information signal having the first frequency; and a second frequency-shifting circuit coupled to the second signal path and configured to:
  receive a second control signal
  shift the first frequency of the second information signal by a fifth frequency in response to the second control signal having a third control value; and
  shift a sixth frequency of a second interference signal on the second signal path during the first period by a sixth frequency in response to the second control signal having a fourth control value.

17. A distributed antenna system, comprising:
a master unit; and
at least one remote antenna unit each coupled to the master unit and including:
  a first signal path configured to carry, during a first period, a first information signal having a first frequency, and
  a first frequency-shifting circuit coupled to the first signal path and configured to:
    receive a first control signal;
    shift the first frequency of the first information signal by a second frequency in response to the first control signal having a first control value; and
    shift a third frequency of a first interference signal on the first signal path during a second period by a fourth frequency in response to the first control signal having a second control value;
  wherein the first frequency-shifting circuit includes an output node configured to carry the frequency-shifted first information signal during the first period and the frequency-shifted interference signal during the second period;
  wherein the first signal path includes:
    a bandpass filter having an input node coupled to the output node of the first frequency-shifting circuit and having an output node;
    an amplifier having an input node coupled to the output node of the bandpass filter and having an output node; and
    an antenna coupled to the output node of the amplifier.

18. The distributed antenna system of claim 17, further comprising an intermediate unit coupled between the master unit and at least one of the at least one remote antenna unit.

19. A communication system, comprising:
a distributed antenna system, including:
a master unit;
at least one remote antenna unit each coupled to the master unit and including:
  a first signal path configured to carry, during a first period, a first information signal having a first frequency; and
  a first frequency-shifting circuit coupled to the first signal path and configured to:
    receive a first control signal;
    shift the first frequency of the first information signal by a second frequency in response to the first control signal having a first control value; and
    shift a third frequency of a first interference signal on the first signal path during a second period by a fourth frequency in response to the first control signal having a second control value;
  a second signal path configured to carry, during the second period, a second information signal having the first frequency; and
  a second frequency-shifting circuit coupled to the second signal path and configured to:
    receive a second control signal
    shift the first frequency of the second information signal by a fifth frequency in response to the second control signal having a third control value; and
    shift a sixth frequency of a second interference signal on the second signal path during the first period by a sixth frequency in response to the second control signal having a fourth control value; and
at least one base station coupled to the distributed antenna system.

* * * * *

UNITED STATES PATENT AND TRADEMARK OFFICE
CERTIFICATE OF CORRECTION

| | | |
|---|---|---|
| PATENT NO. | : 12,445,164 B2 | Page 1 of 1 |
| APPLICATION NO. | : 17/802498 | |
| DATED | : October 14, 2025 | |
| INVENTOR(S) | : Schwab et al. | |

It is certified that error appears in the above-identified patent and that said Letters Patent is hereby corrected as shown below:

In the Claims

At Column 33, Line 35, please replace "sig" with --signal-- between "second" and "path".

At Column 33, Line 36, please replace "contr" with --control-- between "second" and "signal".

Signed and Sealed this
Tenth Day of February, 2026

John A. Squires
*Director of the United States Patent and Trademark Office*